(12) United States Patent
Hayashi et al.

(10) Patent No.: US 9,037,347 B2
(45) Date of Patent: May 19, 2015

(54) VEHICLE

(75) Inventors: Koki Hayashi, Tokyo (JP); Yuji Takakura, Tokyo (JP); Shinji Yamamoto, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 140 days.

(21) Appl. No.: 13/981,154

(22) PCT Filed: Jan. 27, 2012

(86) PCT No.: PCT/JP2012/051861
§ 371 (c)(1),
(2), (4) Date: Jul. 23, 2013

(87) PCT Pub. No.: WO2012/102388
PCT Pub. Date: Aug. 2, 2012

(65) Prior Publication Data
US 2013/0304318 A1    Nov. 14, 2013

(30) Foreign Application Priority Data

Jan. 28, 2011    (JP) ................. 2011-016947

(51) Int. Cl.
| | | |
|---|---|---|
| *B62D 9/02* | (2006.01) | |
| *B62D 9/04* | (2006.01) | |
| *B60T 8/60* | (2006.01) | |
| *B60G 17/015* | (2006.01) | |
| *B60G 17/0195* | (2006.01) | |
| *B62K 5/025* | (2013.01) | |
| *B62K 5/10* | (2013.01) | |

(52) U.S. Cl.
CPC ............... *B62D 9/02* (2013.01); *B60G 17/015* (2013.01); *B60G 17/0195* (2013.01); *B62K 5/025* (2013.01); *B62K 5/10* (2013.01); *B62D 9/04* (2013.01); *B60G 2300/122* (2013.01); *B60G 2300/45* (2013.01)

(58) Field of Classification Search
USPC ...................................... 701/37; 303/146, 148
See application file for complete search history.

(56) References Cited

U.S. PATENT DOCUMENTS

| 8,814,186 B1 * | 8/2014 | Rinda ....................... 280/93.504 |
|---|---|---|
| 2002/0109402 A1 * | 8/2002 | Nakamura .................... 303/146 |

FOREIGN PATENT DOCUMENTS

| JP | A-62-103215 | 5/1987 |
|---|---|---|
| JP | 2005088742 A * | 4/2005 |
| JP | A-2005-88742 | 4/2005 |
| JP | A-2010-247804 | 11/2010 |
| JP | 2011046297 A * | 3/2011 |

OTHER PUBLICATIONS

English translation of JP 2011046297 A.*
English translation of JP 2005088742 A.*
Apr. 24, 2012 International Search Report issued in International Application No. PCT/JP2012/051861.

* cited by examiner

*Primary Examiner* — Fadey Jabr
*Assistant Examiner* — Yazan A Soofi
(74) *Attorney, Agent, or Firm* — Oliff PLC

(57) ABSTRACT

Described herein are devices and methods for controlling inclination in a vehicle. In certain aspects, inclination of the vehicle can be controlled with an inclination control processing section that includes a first control value limiting processing section which calculates a moving amount of the centroid, calculates a maximum angular acceleration, and limits a variation of the control value for inclination control on the basis of the maximum angular acceleration.

4 Claims, 19 Drawing Sheets

VEHICLE

TECHNICAL FIELD

The present invention relates to a vehicle.

BACKGROUND ART

Conventionally, a vehicle is generally designed to allow not only a driver who is an occupant but also other occupants to ride in the vehicle. However, in many cases, only the driver rides in the vehicle, which results in wasteful consumption of energy. In views of this, a vehicle, such a tricycle or a four-wheel vehicle, which has a single seat has been provided.

However, in such a single seat vehicle, the position of the centroid becomes higher when a driver rides in the vehicle. Therefore, stability at the time when the driver turns the vehicle; i.e., stability during turning (hereinafter referred as "turning stability"), decreases. In order to overcome this drawback, there has been proposed a single seat vehicle which is inclined toward the turning center at the time of turning to thereby increase the turning stability (see, for example, Patent Document 1).

Patent Document 1: Japanese Patent Application Laid-Open (kokai) No. 2005-88742

DISCLOSURE OF THE INVENTION

Problem to be Solved by the Invention

However, the above-mentioned conventional vehicle encounters difficulty in inclining the vehicle by a proper angle. Therefore, the driver feels an unnatural sensation or becomes uneasy at the time of turning.

In order to solve such a problem, a vehicle, such as a tricycle, may be configured to include a link mechanism, a link motor, etc., and perform inclination control (attitude control) at the time of turning so as to drive the link motor, to thereby operate the link mechanism such that the lateral acceleration acting on the vehicle becomes 0 (zero), whereby the vehicle can be inclined by an angle corresponding to the centrifugal force acting on the vehicle.

In this case, since the tricycle can be inclined by an angle corresponding to the centrifugal force, the driver neither feels an unnatural sensation nor becomes uneasy at the time of turning.

However, when a certain wheel lifts from the road surface or falls into a hollow, the tricycle may be inclined beyond an operation limit determined by the geometry, position of centroid, etc. of the tricycle. As a result, the tricycle becomes unable to travel stably, and the driver feels an unnatural sensation.

An object of the present invention is to solve the problem of the conventional tricycle and to provide a vehicle which can travel stably and whose driver does not feel any unnatural sensation.

In order to achieve the object, a vehicle of the present invention comprises a main body section having a wheel for travel; a cockpit section connected to the main body section; a steering section which includes a steering member operated by a driver, a wheel for steering, a steering shaft connecting the steering member and the wheel for steering and swingably supported by the cockpit section, and an acceleration operation member for accelerating the vehicle; a vehicle inclining apparatus which includes a vehicle inclining mechanism which inclines a predetermined inclination portion of the vehicle and an actuator for operating the vehicle inclining mechanism; a lateral acceleration detection section disposed at a predetermined location on the inclination portion and adapted to detect a lateral acceleration acting on the inclination portion; an inclination control processing section which generates a control value for inclination control for inclining the inclination portion, in accordance with the lateral acceleration detected by the lateral acceleration detection section; an inclination drive control processing section which drives the actuator on the basis of the control value for inclination control generated by the inclination control processing section; a travel control processing section which generates, on the basis of an amount of operation of the acceleration operation member by the driver, a control value for travel control for driving a drive section for travel for traveling the vehicle; and a travel drive control processing section which drives the drive section for travel on the basis of the control value for travel control generated by the travel control processing section.

The inclination control processing section includes a centroid moving amount calculation processing section which calculates a moving amount of the centroid of the vehicle in a front-rear direction thereof, a maximum angular acceleration calculation processing section which calculates a maximum angular acceleration on the basis of the moving amount of the centroid of the vehicle in the front-rear direction thereof, and a first control value limiting processing section which limits a variation of the control value for inclination control on the basis of the maximum angular acceleration.

Effects of the Invention

According to the present invention, a vehicle comprises a main body section having a wheel for travel; a cockpit section connected to the main body section; a steering section which includes a steering member operated by a driver, a wheel for steering, a steering shaft connecting the steering member and the wheel for steering and swingably supported by the cockpit section, and an acceleration operation member for accelerating the vehicle; a vehicle inclining apparatus which includes a vehicle inclining mechanism which inclines a predetermined inclination portion of the vehicle and an actuator for operating the vehicle inclining mechanism; a lateral acceleration detection section disposed at a predetermined location on the inclination portion and adapted to detect a lateral acceleration acting on the inclination portion; an inclination control processing section which generates a control value for inclination control for inclining the inclination portion, in accordance with the lateral acceleration detected by the lateral acceleration detection section; an inclination drive control processing section which drives the actuator on the basis of the control value for inclination control generated by the inclination control processing section; a travel control processing section which generates, on the basis of an amount of operation of the acceleration operation member by the driver, a control value for travel control for driving a drive section for travel for traveling the vehicle; and a travel drive control processing section which drives the drive section for travel on the basis of the control value for travel control generated by the travel control processing section.

The inclination control processing section includes a centroid moving amount calculation processing section which calculates a moving amount of the centroid of the vehicle in a front-rear direction thereof, a maximum angular acceleration calculation processing section which calculates a maximum angular acceleration on the basis of the moving amount of the centroid of the vehicle in the front-rear direction thereof, and a first control value limiting processing section which limits a variation of the control value for inclination control on the basis of the maximum angular acceleration.

In this case, the moving amount of the centroid of the vehicle is calculated, the maximum angular acceleration at the centroid is calculated on the basis of the moving amount of the centroid, and the variation of the control value for inclination control is limited on the basis of the maximum angular acceleration. Therefore, even when a certain wheel lifts from a road surface or falls into a hollow, the vehicle is not inclined beyond an operation limit determined by the geometry, position of centroid, etc. of the vehicle.

Accordingly, the vehicle can be traveled stably, and the driver does not feel any unnatural sensation.

DESCRIPTION OF SYMBOLS

Figure 1:
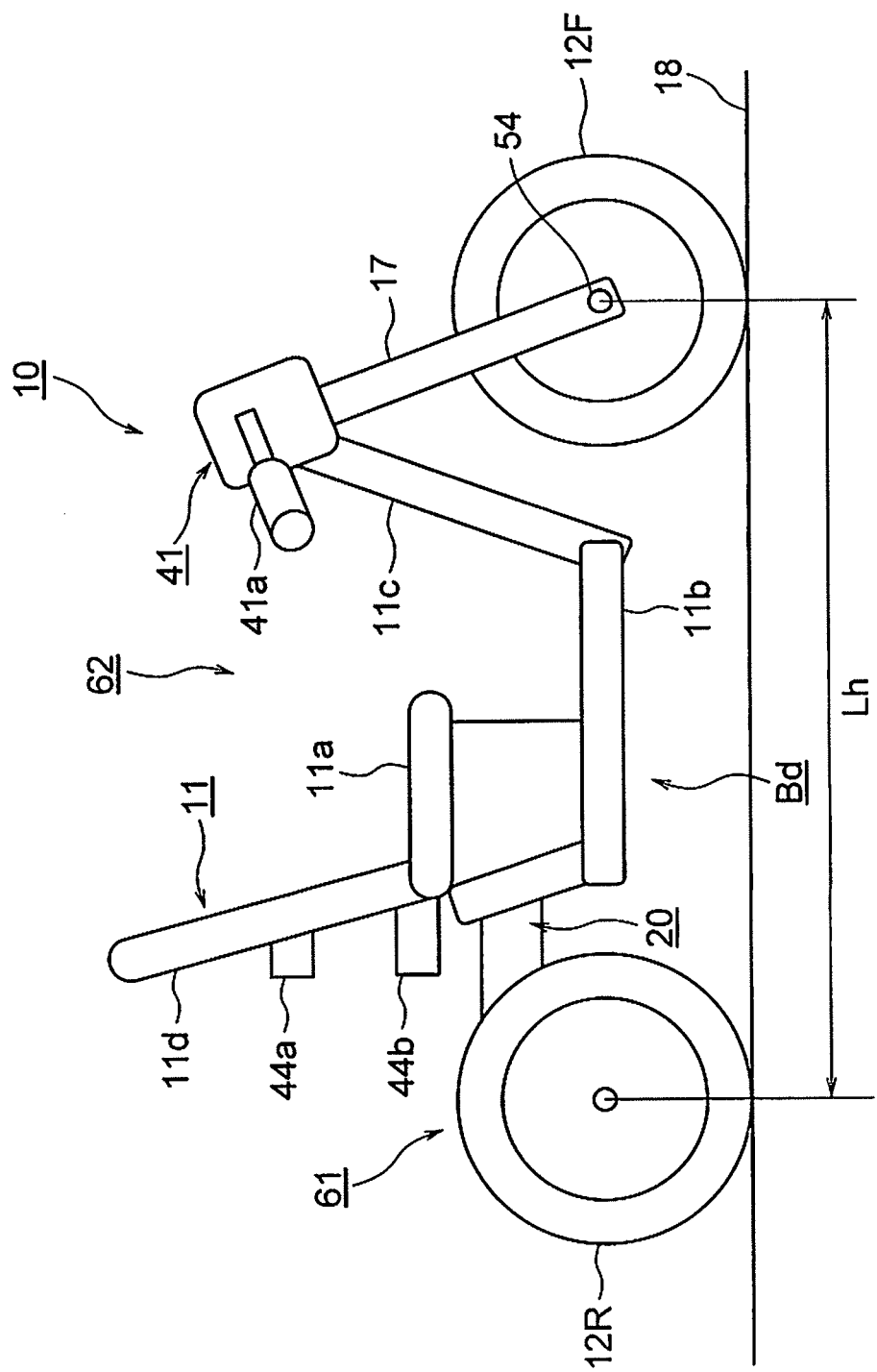
FIG. 1 Left side view of a tricycle according to a first embodiment of the present invention.

10: tricycle
11: cockpit section
12F, 12L, 12R: wheel
17: front wheel fork
25: link motor
30: link mechanism
40: control section
41: manipulation apparatus
41a: handle bar
43: vehicle inclining apparatus
44a: first lateral acceleration sensor
44b: second lateral acceleration sensor
51L, 51R: drive motor
71: inclination control section
72: inclination drive control section
73: travel control section
74: travel drive control section
Fr: frame

BEST MODE FOR CARRYING OUT THE INVENTION

Embodiments of the present invention will now be described in detail with reference to the drawings.

Figure 2:
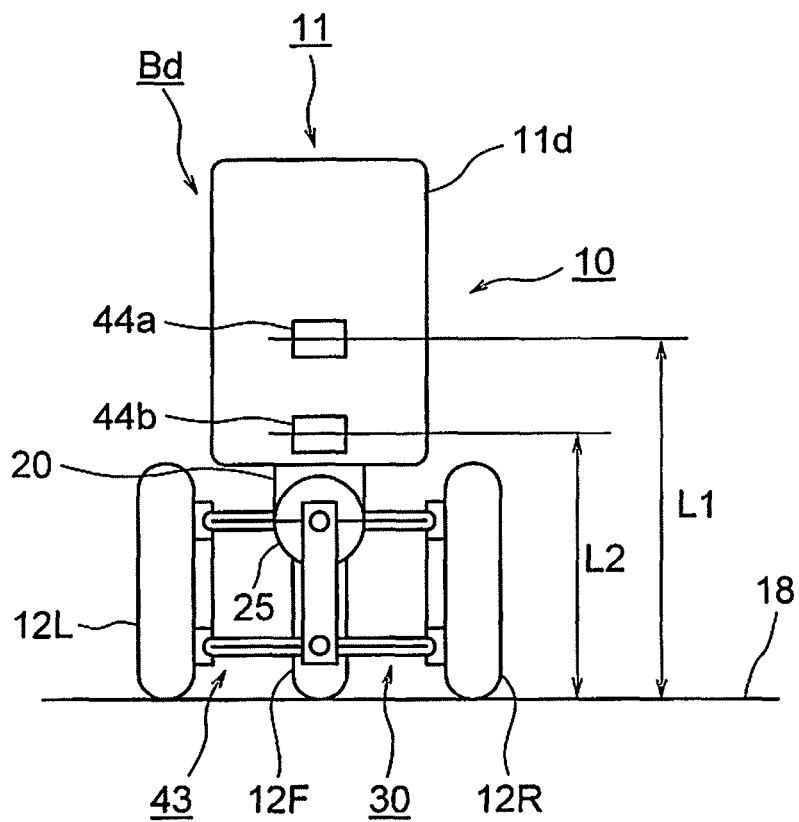
FIG. 2 Rear view of the tricycle according to the first embodiment of the present invention.
Figure 3:
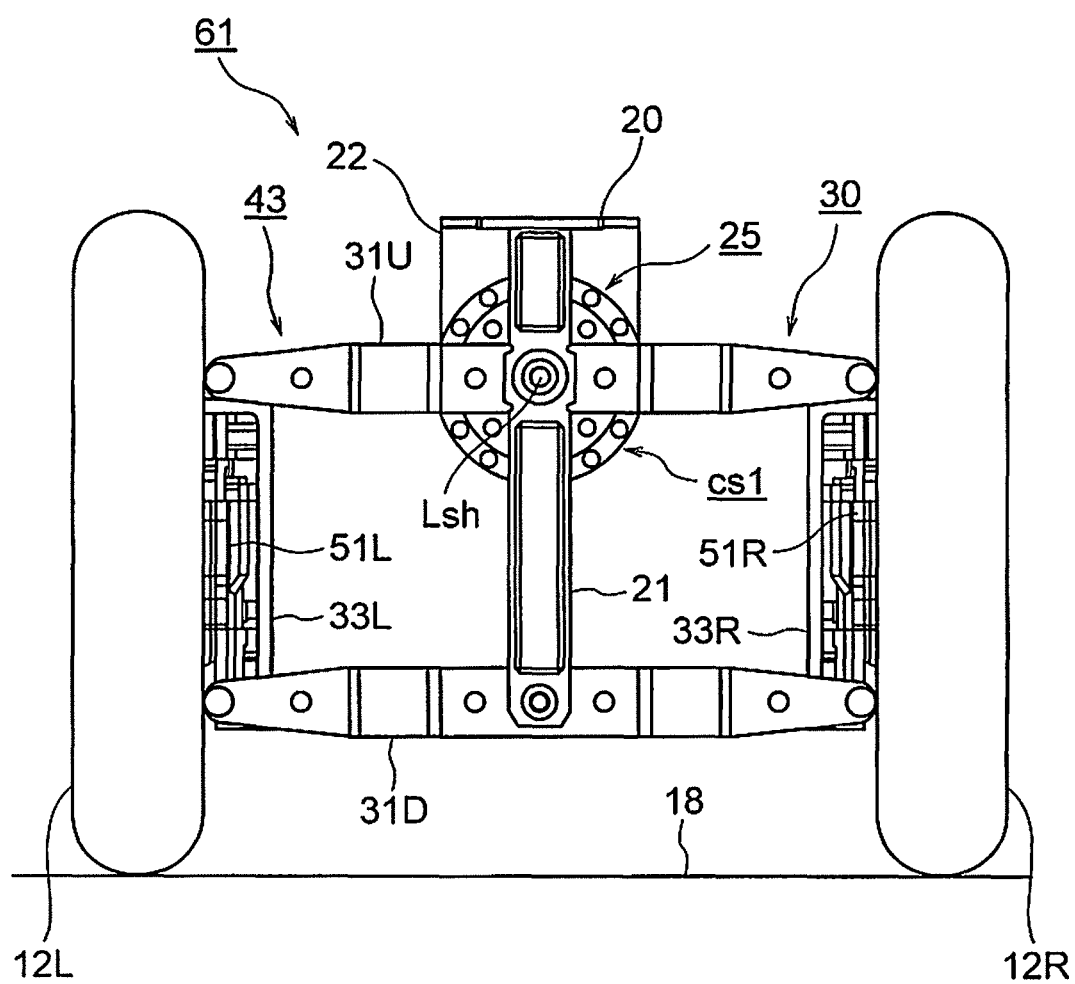
FIG. 3 View showing a vehicle inclining apparatus according to the first embodiment of the present invention.
Figure 4:
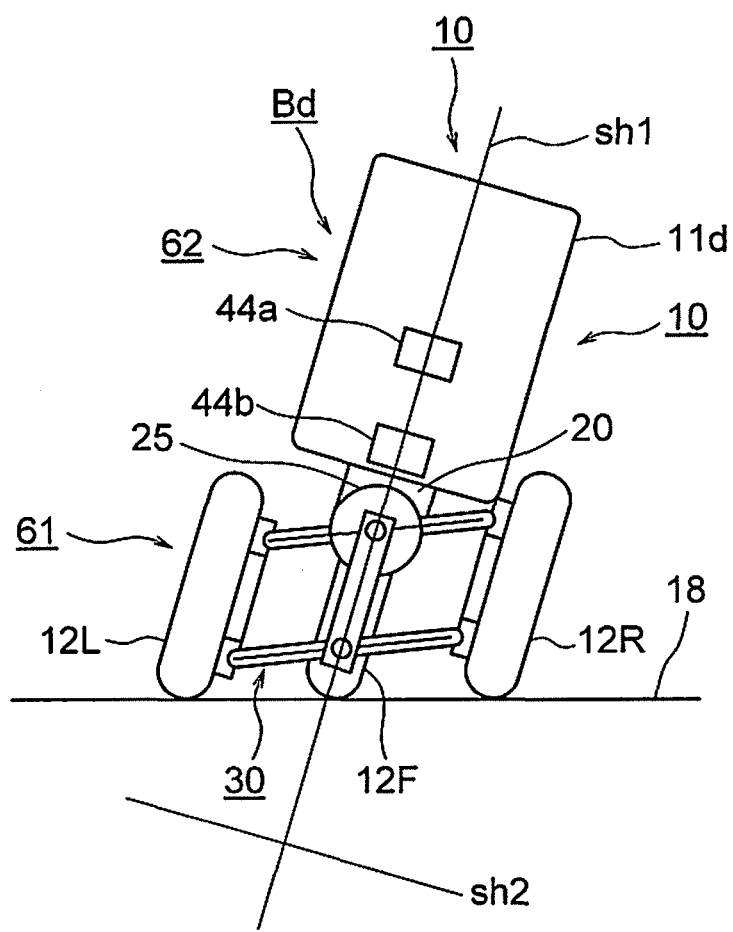
FIG. 4 View showing a state in which the tricycle according to the first embodiment of the present invention is inclined.

FIG. 1 is a left side view (a left side view according to the third-angle system) of a tricycle according to a first embodiment of the present invention. FIG. 2 is a rear view of the tricycle according to the first embodiment of the present invention. FIG. 3 is a view showing a vehicle inclining apparatus according to the first embodiment of the present invention. FIG. 4 is a view showing a state in which the tricycle according to the first embodiment of the present invention is inclined.

In these drawings, reference numeral 10 denotes a tricycle which has a vehicle main body Bd, and three wheels 12F, 12L, and 12R which are rotatably disposed on the vehicle main body Bd.

The vehicle main body Bd has a cockpit section 11 on which a driver gets; a front wheel fork 17 (steering shaft) for connecting the cockpit section 11 and the wheel 12F; a support section 20 which is disposed rearward of the cockpit section 11 and which supports the cockpit section 11; a manipulation apparatus 41 which is disposed forward of the cockpit section 11 and which allows the driver to manipulate the tricycle 10; a vehicle inclining apparatus 43 which is disposed below the support section 20 and is adapted to incline (lean) a predetermined inclination portion of the tricycle 10 (the entirety of the tricycle 10 in the present embodiment) leftward and rightward in relation to a road surface 18; etc. Notably, the cockpit section 11 and the support section 20 are connected together via an unillustrated connecting section.

The support section 20, the vehicle inclining apparatus 43, the wheels 12L and 12R, etc. constitute a main body section 61. The wheel 12F, the front wheel fork 17, the manipulation apparatus 41, etc. constitute a steering section for steering the tricycle 10. The steering section and the cockpit section 11 constitute a cockpit/steering section 62.

The wheel 12F is rotatably disposed on the front wheel fork 17 to be located at a predetermined position at the front end of the vehicle main body Bd (the center in the width direction of the tricycle 10 in the present embodiment). The wheel 12F functions as a front wheel and also functions as a wheel for steering (steering wheel). Notably, a vehicle speed sensor 54 (vehicle speed detection section) for detecting vehicle speed v is disposed on the axle of the wheel 12F.

The wheels 12L and 12R are rotatably disposed on the support section 20 to be located at predetermined positions at the rear end of the vehicle main body Bd (the left and right ends in the width direction of the tricycle 10 in the present embodiment). The wheels 12L and 12R function as rear wheels and also function as wheels for travel (drive wheels). In order to enable the tricycle 10 to travel, drive motors 51L and 51R (drive section for travel) are provided for the wheels 12L and 12R. By driving the drive motors 51L and 51R, the wheels 12L and 12R can be rotated, whereby a drive force of the tricycle 10 can be generated. The drive motors 51L and 51R are accommodated within the wheels 12L and 12R, respectively, and constitute in-wheel motors. Notably, Lh represents the distance between the axle of the wheel 12F and the axles of the wheels 12L and 12R; i.e., the distance between the front and rear wheels (wheelbase).

In the present embodiment, a servomotor for which speed control, torque control, etc. can be performed is used for the drive motors 51L and 51R. However, motors of other types may be used for the drive motors 51L and 51R. Also, in the present embodiment, the drive motors 51L and 51R are accommodated within the wheels 12L and 12R, respectively. However, a single drive motor may be disposed in the wheel 12F. Alternatively, a single drive motor may be disposed in each of the wheels 12F, 12L, and 12R. Alternatively, a drive motor may be disposed at a predetermined location on the vehicle main body Bd, and may be connected to the wheel 12F, to the wheels 12L and 12R, or to the wheels 12F, 12L, and 12R.

In the present embodiment, one wheel 12F is disposed at the front end of the vehicle main body Bd, and two wheels 12L and 12R are disposed at the rear end of the vehicle main body Bd. However, two wheels may be disposed at the front end of the vehicle main body Bd, and a single wheel may be disposed at the rear end of the vehicle main body Bd. Notably, in the case where the vehicle is a two-wheel vehicle, a wheel is disposed at each of the left and right ends of the vehicle main body. In the case where the vehicle is a four-wheel vehicle, a wheel is disposed at each of the left and right ends of the front end of the vehicle main body and the left and right ends of the rear end thereof.

The cockpit section 11 includes a seat 11a on which the driver sits; a foot rest 11b (serving as a cockpit section main body and a floor member) which is disposed forward of the seat 11a and on which the driver places his/her feet; a front arm 11c (serving as a front support section) which extends upward from the front end of the foot rest 11b and inclines forward; and a seat back portion 11d which extends upward from the rear end of the seat 11a. Notably, in the present embodiment, the tricycle 10 is a single seater, and only the driver gets on the cockpit section 11. However, the cockpit section 11 may be expanded so as to allow the driver and other occupants to get into the cockpit section 11, or an auxiliary cockpit section may be formed above the wheels 12L and 12R located rearward of the cockpit section 11 so as to allow other occupants to get into the auxiliary cockpit section.

The front wheel fork 17 is composed of, for example, a telescopic-type fork which includes a spring (an urging member), and functions as a suspension apparatus.

The manipulation apparatus 41 includes a handle bar 41a (serving as a first operation section and a steering member) which changes the heading direction of the tricycle 10 and turns the tricycle 10; unillustrated meters (serving as display elements) such as a speed meter and an indictor; unillustrated switches (serving as operation elements) such as a start switch and buttons; etc. Notably, instead of the handle bar 41a, a steering wheel, a jog dial, a touch panel, a push button, or the like may be disposed as the first operation section and the steering member.

An unillustrated stem holder (serving as a steering shaft support section) is unitedly formed at the upper end of the front arm 11c in an inclined state such that the upper end of the stem holder is located rearward of the lower end thereof. The handle bar 41a, the front wheel fork 17, the wheel 12F, etc. are swingably supported by the stem holder. Accordingly, when the driver operates and turns the handle bar 41a, the front wheel fork 17 and the wheel 12F are turned by a predetermined steering angle corresponding to the amount of turning of the handle bar 41a, whereby the heading direction of the tricycle 10 is changed.

An accelerator grip and a brake lever, which are not shown, are provided on the handle bar 41a. The accelerator grip, which serves as a second operation section and an acceleration operation member, is used to start and accelerate the tricycle 10. The brake lever, which serves as a third operation section and a first deceleration operation member, is used to decelerate (including braking) and stop the tricycle 10. In place of the accelerator grip, an accelerator pedal, which serves as an acceleration operation member, may be disposed on the foot rest 11b. Also, an unillustrated brake pedal, etc. are disposed on the foot rest 11b. The brake pedal, which serves as a fourth operation section and a second deceleration operation member, is used to decelerate the tricycle 10.

Accordingly, the driver can cause the tricycle 10 to travel under predetermined travel conditions (e.g., steering angle, vehicle speed, etc.) by operating the handle bar 41a, the accelerator grip, the brake lever, the brake pedal, etc.

A steering angle sensor, an accelerator sensor, a brake sensor, etc., which are not shown, are disposed in the manipulation apparatus 41. The steering angle sensor, which serves as a steering amount detection section, detects a steering angle $\gamma$ which represents the amount of operation of the handle bar 41a by the driver; i.e., the amount of steering operation. The accelerator sensor, which serves as an acceleration operation amount detection section, detects an accelerator operation value $\alpha$ which represents the amount of operation of the accelerator grip by the driver; i.e., the amount of acceleration operation. The brake sensor, which serves as a deceleration operation amount detection section, detects a brake operation value $\beta$ which represents the amount of operation of the brake lever, the brake pedal, or the like by the driver; i.e., the amount of deceleration operation. Notably, the steering angle $\gamma$ represents a demanded turning amount which is demanded for the tricycle 10.

An unillustrated yaw rate sensor which serves as a first angular velocity detection section and a yaw rate detection section is disposed at a predetermined location on the tricycle 10. The yaw rate sensor detects a yaw rate $\eta$. The yaw rate $\eta$ is a rotation angle by which the tricycle 10 rotates, during turning, about an axis which extends in the vertical direction in relation to the vehicle main body Bd; i.e., a change rate of yaw angle. The yaw rate $\eta$ is represented by angular velocity. Notably, the yaw rate sensor is composed of, for example, a gyro sensor, and is attached such that it can detect the angular velocity within a plane which is parallel to a horizontal ground surface when the tricycle 10 is stopped.

Further, an unillustrated roll rate sensor which serves as a second angular velocity detection section and a roll rate detection section is disposed at a predetermined location on the tricycle 10. The roll rate sensor detects a roll rate 8. The roll rate $\epsilon$ is a rotation angle by which the tricycle 10 rotates, during rolling (inclining motion), about an axis which extends in the front-rear direction; i.e., a change rate of roll angle. The roll rate $\epsilon$ is represented by angular velocity. Notably, the roll rate sensor is composed of, for example, a gyro sensor, and is attached such that it can detect the rotational angular velocity within a plane which is orthogonal to the ground surface and is also orthogonal to the heading direction of the tricycle 10.

Also, the vehicle inclining apparatus 43 includes a link mechanism 30 and a link motor 25. The link mechanism 30 serves as a support mechanism for supporting the wheels 12L and 12R, and also serves as a vehicle inclining mechanism for inclining the entirety of the tricycle 10. The link motor 25, which serves as an actuator and a drive section for inclination, operates the link mechanism 30 to thereby incline the tricycle 10. In the present embodiment, a servomotor for which speed control, torque control, etc. can be performed is used for the link motor 25. However, other types of motors may be used for the link motor 25.

The link mechanism 30 includes a left-side vertical link unit 33L, a right-side vertical link unit 33R, an upper lateral link unit 31U, a lower lateral link unit 31D, and a center vertical member 21. The left-side vertical link unit 33L is disposed on the inner side of the wheel 12L (on the side toward the center of the tricycle 10), extends in the vertical direction, and supports the drive motor 51L. The right-side vertical link unit 33R is disposed on the inner side of the wheel 12R, extends in the vertical direction, and supports the drive motor 51R. The upper lateral link unit 31U is connected to upper end portions of the vertical link units 33L and 33R such that the upper lateral link unit 31U can rotate relative to the vertical link units 33L and 33R. The lower lateral link unit 31D is connected to lower end portions of the vertical link units 33L and 33R such that the lower lateral link unit 31D can rotate relative to the vertical link units 33L and 33R. The center vertical member 21 extends in the vertical direction, and its upper end is fixed to the support section 20 such that the center vertical member 21 cannot rotate relative to the support section 20. The center vertical member 21 is connected to central portions of the lateral link units 31U and 31D such that the center vertical member 21 can rotate relative to the lateral link units 31U and 31D.

Each of the drive motors 51L and 51R includes an unillustrated casing (stationary member), an unillustrated stator attached to the casing, an unillustrated rotor disposed to be rotatable relative to the stator, and an unillustrated output shaft attached to the rotor. The casings of the drive motors 51L and 51R are fixed to the vertical link units 33L and 33R, and the output shafts of the drive motors 51L and 51R are connected to the axles of the wheels 12L and 12R.

The link motor 25 is fixed to the support section 20 via a support plate 22 which extends downward from the support section 20. The link motor 25 includes a casing cs1 (stationary member), an unillustrated stator attached to the casing cs1, an unillustrated rotor disposed to be rotatable relative to the stator, and an output shaft Lsh attached to the rotor. The casing cs1 is non-rotatably fixed to the support section 20 and the center vertical member 21 via the support plate 22. The output shaft Lsh is non-rotatably fixed to the lateral link unit 31U. Notably, the output shaft Lsh is disposed on the same axis as that of a connection shaft which connects the center vertical member 21 and the lateral link unit 31U together such that they can rotate relative to each other.

Accordingly, when the output shaft Lsh is rotated by a predetermined angle relative to the casing cs1 by driving the link motor 25, the lateral link unit 31U is rotated by the predetermined angle relative to the support section 20 and the center vertical member 21. As a result, the link mechanism 30 operates and leans. As a result, as shown in FIG. 4, the tricycle 10 is inclined by the predetermined angle. With this operation, the wheels 12F, 12L, and 12R are inclined by the predetermined angle from a vertical state in which they are vertical in relation to the road surface 18, whereby a camber is imparted to the wheels.

Notably, an unillustrated link angle sensor is disposed on the link motor 25. The link angle sensor serves as an angle detection section for detecting, as a link angle $\theta$, an angle by which the tricycle 10 has been inclined. The link angle sensor is a rotational angle sensor for detecting the rotational angle of the output shaft Lsh relative to the casing cs1, and is composed of, for example, a resolver, an encoder, or the like. As described above, when the output shaft Lsh is rotated relative to the casing cs1 by driving the link motor 25, the lateral link unit 31U is rotated by a predetermined angle relative to the support section 20 and the center vertical member 21. Therefore, by detecting the rotational angle of the output shaft Lsh relative to the casing cs1, a change in the angle of the lateral link unit 31U relative to the center vertical member 21 can be detected as the link angle $\theta$.

Also, the link motor 25 includes an unillustrated lock mechanism for making the output shaft Lsh non-rotatable relative to the casing cs1 at an arbitrary rotational angle. The lock mechanism is a brake or a like mechanism. Notably, no electric power is consumed by the link motor 25 during a period in which the output shaft Lsh is made non-rotatable relative to the casing cs1 at the above-mentioned rotational angle by the lock mechanism.

In the present embodiment, the casing cs1 is non-rotatably fixed to the support section 20 and the center vertical member 21, and the output shaft Lsh is non-rotatably fixed to the lateral link unit 31U. However, the embodiment may be modified such that the casing cs1 is non-rotatably fixed to the lateral link unit 31U, and the output shaft Lsh is non-rotatably fixed to the support section 20 and the center vertical member 21.

An unillustrated battery apparatus (an energy source for the drive motors 51L and 51R and the link motor 25) and an unillustrated control section are disposed on the rear side or lower side of the cockpit section 11, or on the support section 20.

Incidentally, when the tricycle 10 is turned, a centrifugal force is generated in a radially outward direction along a line extending from the turning center of the turning track. At that time, when the tricycle 10 is inclined toward the turning center side as shown in FIG. 4, the resultant force of a centrifugal acceleration which generates the centrifugal force and the gravitational acceleration acting on the tricycle 10 apparently acts toward the lower side of the vehicle main body Bd. Namely, when an axis extending along the height direction of the tricycle 10 (the direction in which the center vertical member 21 extends) is defined as a height direction axis sh1 and an axis extending along the width direction of the tricycle 10 (the direction orthogonal to the height direction axis sh1) is defined as a width direction axis sh2, the component of the centrifugal acceleration along the width direction axis sh2; i.e., the width direction component, decreases by an amount corresponding to the width direction component of the gravitational acceleration. At that time, the lateral acceleration which acts on the tricycle 10 due to the width direction component of the centrifugal acceleration becomes smaller by an amount corresponding to the lateral acceleration which acts on the tricycle 10 due to the width direction component of the gravitational acceleration.

When the width direction component of the centrifugal acceleration and the width direction component of the gravitational acceleration are made equal to each other, the lateral acceleration acting on the tricycle 10 becomes zero, and in this state, only the sum of the component along the height direction axis sh1 (i.e., the height direction component) of the centrifugal acceleration and the height direction component of the gravitational acceleration apparently acts on the tricycle 10 and the driver.

In view of this, in the present embodiment, at the time of turning, the tricycle 10 is inclined such that the lateral acceleration acting on the tricycle 10 becomes zero. Thus, the turning stability is increased, and the driver neither feels an unnatural sensation nor becomes uneasy.

For such operation, a first lateral acceleration sensor 44a and a second lateral acceleration sensor 44b, which serve as a plurality of (two in the present embodiment) lateral acceleration detection sections, are disposed on a predetermined portion of the tricycle 10 (on the back surface of the seat back portion 11d in the present embodiment) such that the two sensors are located at different heights. The first and second lateral acceleration sensors 44a and 44b are sensors each composed of an ordinary acceleration sensor, a gyro sensor, or the like, and detect first and second lateral accelerations a1 and a2.

In the present embodiment, the first and second lateral acceleration sensors 44a and 44b are disposed on the tricycle 10. However, only one lateral acceleration sensor may be provided on the tricycle 10.

Notably, in the case where only one lateral acceleration sensor is provided on the tricycle 10, an unnecessary acceleration component which is not attributable directly to the centrifugal force may be detected as a disturbance. For example, in the case where one of the wheels 12L and 12R falls into a hollow of the road surface 18 while the tricycle 10 is travelling, the tricycle 10 inclines, and the lateral acceleration sensor moves accordingly, whereby a certain lateral acceleration is detected.

Also, in the tricycle 10, the wheels 12L and 12R have tires each of which has a portion having elasticity and functioning as a spring, and plays are unavoidably produced at connection portions between components. Accordingly, the lateral acceleration sensor moves as a result of expansion or contraction of the portion functioning as a spring, production of a play, or the like, whereby a certain lateral acceleration is detected.

In the present embodiment, since the first lateral acceleration sensor 44a and the second lateral acceleration sensor 44b are disposed at proper positions as described above, an unnecessary acceleration component is not detected.

Also, in the present embodiment, as shown in FIG. 2, the first lateral acceleration sensor 44a and the second lateral acceleration sensor 44b are disposed on the back surface of the seat back portion lid of the cockpit section 11 at heights L1 and L2, which are distances from the road surface 18 measured in the gravitational direction. The heights L1 and L2 are determined to satisfy a relation L1>L2. The smaller the inter-sensor distance $\Delta L$, which is represented by the difference between the heights L1 and L2, the smaller the difference between the first and second lateral accelerations a1 and a2, and the greater the possibility of detection of an unnecessary acceleration component. Therefore, the first lateral acceleration sensor 44a and the second lateral acceleration sensor 44b are disposed such that the inter-sensor distance $\Delta L$ becomes sufficiently large, for example, 0.3 m or greater.

Strictly speaking, the center of rolling motion of the tricycle 10 at the time when it is inclined; i.e., the roll center, is located slightly below the road surface 18. However, in the present embodiment, the roll center is assumed to be located on the road surface 18, and the heights L1 and L2 are assumed to be distances from the road surface 18.

The first lateral acceleration sensor 44a and the second lateral acceleration sensor 44b are desirably attached to a member having a sufficiently high rigidity (e.g., the seat back portion 11d) such that they are located at a position which is between the axle of the wheel 12F and the axels of the left and right wheels 12L and 12R and which is as close as possible to the driver. Notably, in the case where the vehicle main body Bd is supported by a spring such as a suspension, both the first lateral acceleration sensor 44a and the second lateral acceleration sensor 44b are desirably disposed on a so-called "sprung" side. Further, it is preferred that both the first lateral acceleration sensor 44a and the second lateral acceleration sensor 44b be located on the center axis of the tricycle 10, which extends in the heading direction of the tricycle 10, and be not offset from the center axis.

When the first and second lateral accelerations a1 and a2 are detected by the first and second lateral acceleration sensors 44a and 44b while the tricycle 10 is tuning, in the control section, feedback control for the link motor 25 is performed such that a lateral acceleration obtained by combining the first and second lateral accelerations a1 and a2; i.e., a resultant lateral acceleration, becomes 0. As a result, the tricycle 10 is inclined toward the turning center by an angle corresponding to the centrifugal force. Accordingly, the resultant lateral acceleration acting on the tricycle 10 becomes zero, whereby turning stability can be increased.

Notably, unillustrated first and second longitudinal acceleration sensors, which serve as two longitudinal acceleration detection sections, are disposed at the same locations as those of the first and second lateral acceleration sensors 44a and 44b. The first and second longitudinal acceleration sensors are sensors each composed of an ordinary acceleration sensor, a gyro sensor, or the like, and detect accelerations of the tricycle 10 in the front-rear direction thereof as first and second longitudinal accelerations b1 and b2.

Next, there will be described an inclination control system for inclining the tricycle 10.

Figure 5:
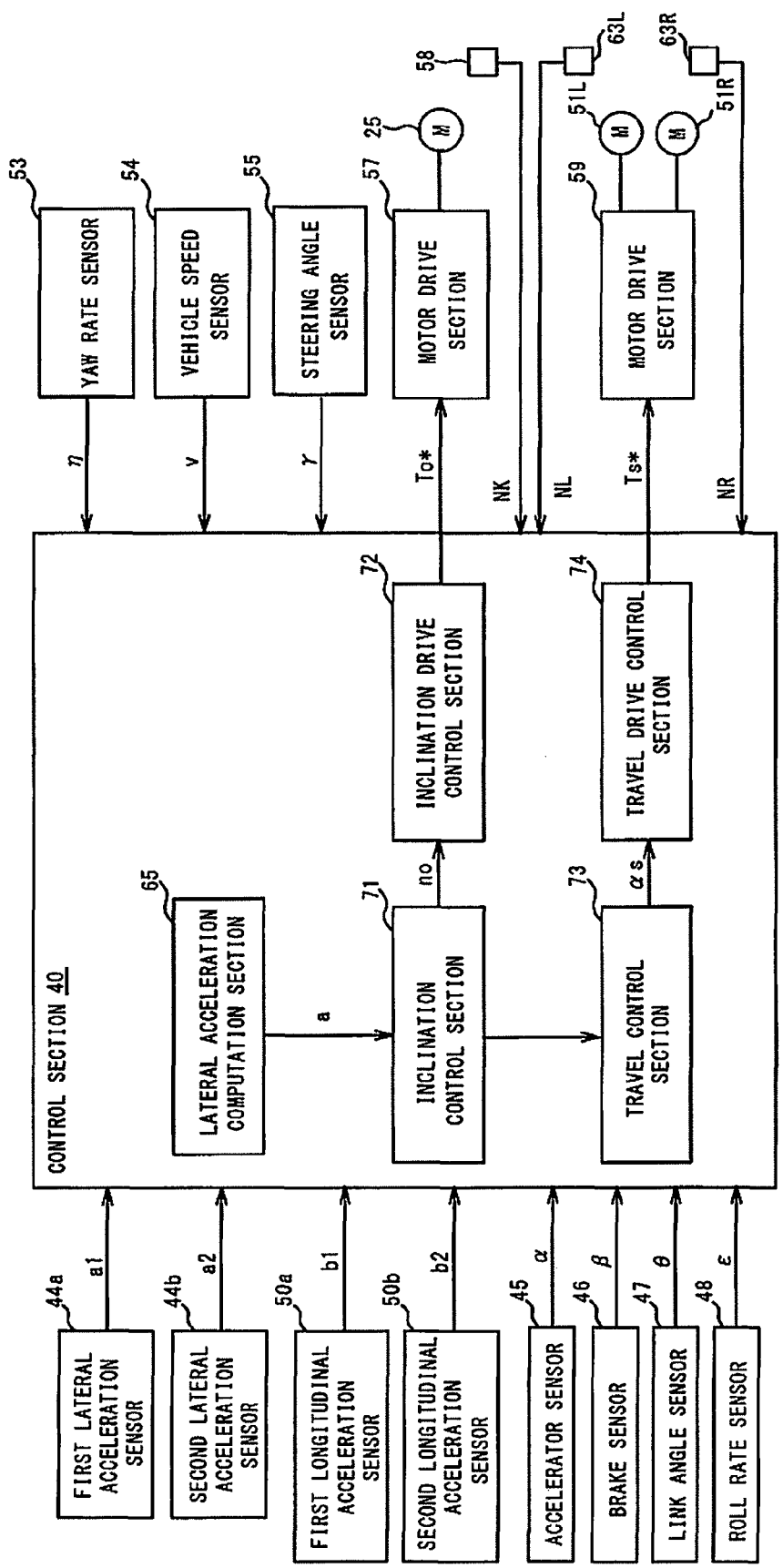
FIG. 5 Block diagram showing an inclination control system of the tricycle according to the first embodiment of the present invention.

FIG. 5 is a block diagram showing an inclination control system of the tricycle according to the first embodiment of the present invention.

In FIG. 5, reference numeral 40 denotes a control section for controlling the entirety of the tricycle 10. While the power of the control section 40 is ON, various types of processes are performed at predetermined control intervals (control period) Ts (e.g., 5 ms). The control section 40 is composed of an unillustrated CPU (a computation device functioning as a computer), an unillustrated RAM (a first storage device), an unillustrated ROM (a second storage device), an input/output interface, etc. The RAM and ROM are composed of a magnetic disc, a semiconductor memory, or the like which functions as a storage medium.

The above-mentioned first lateral acceleration sensor 44a, the above-mentioned second lateral acceleration sensor 44b, a first longitudinal acceleration sensor 50a, a second longitudinal acceleration sensor 50b, an accelerator sensor 45, a brake sensor 46, a link angle sensor 47, a roll rate sensor 48, a yaw rate sensor 53, the above-mentioned vehicle speed sensor 54, a steering angle sensor 55, a motor drive section 57, a speed sensor 58, a motor drive section 59, speed sensors 63L and 63R, etc. are connected to the control section 40. The motor drive section 57 is composed of an inverter or the like and serves as a first drive circuit for driving the link motor 25. The speed sensor 58 serves as a rotational speed detection section for inclination control which detects the rotational speed (angular velocity) of the link motor 25. The motor drive section 59 is composed of an inverter or the like and serves as a second drive circuit for driving the drive motors 51L and 51R. The speed sensors 63L and 63R serve as rotational speed detection sections for travel control which detect the rotational speeds (angular velocities) of the drive motors 51L and 51R.

The first lateral acceleration sensor 44a detects the first lateral acceleration a1. The second lateral acceleration sensor 44b detects the second lateral acceleration a2. The first longitudinal acceleration sensor 50a detects the first longitudinal acceleration b1. The second longitudinal acceleration sensor 50b detests the second longitudinal acceleration b2. The accelerator sensor 45 detects the above-mentioned accelerator operation value α. The brake sensor 46 detects the above-mentioned brake operation value β. The link angle sensor 47 detects the link angle θ. The roll rate sensor 48 detects the roll rate ε. The yaw rate sensor 53 detects the yaw rate η. The vehicle speed sensor 54 detects the vehicle speed v. The steering angle sensor 55 detects the steering angle γ. The speed sensors 58, 63L, and 63R detect the rotational speeds NK, NL, and NR, respectively. These sensors send the detected values to the control section 40 as sensor outputs. Notably, the steering angle of the handle bar 41a can be calculated on the basis of the yaw rate η detected by the yaw rate sensor 53.

The control section 40 includes a lateral acceleration computation section 65, an inclination control section 71, an inclination drive control section 72, a travel control section 73, and a travel drive control section 74, etc. The lateral acceleration computation section 65, which serves as lateral acceleration calculation processing means, calculates the resultant lateral acceleration a from the first and second lateral accelerations a1 and a2. The inclination control section 71, which serves as inclination control processing means, generates a speed command value no (a control value for inclination control) for driving the link motor 25, on the basis of the resultant lateral acceleration a. The inclination drive control section 72, which serves as inclination drive control processing means, generates a torque command value To* (a command value for inclination control) for driving the link motor 25, on the basis of the speed command value no, and sends the torque command value To* to the motor drive section 57. The travel control section 73, which serves as travel control processing means, generates a throttle command value αs (a control value for travel control and an acceleration command value) on the basis of the accelerator operation value α. The travel drive control section 74, which serves as travel drive control processing means, generates a torque command value Ts* (a command value for travel control) for driving the drive motors 51L and 51R, on the basis of the throttle command value αs, and sends the torque command value Ts* to the motor drive section 59.

Next, operation of the control section 40 will be described.

Figure 6:
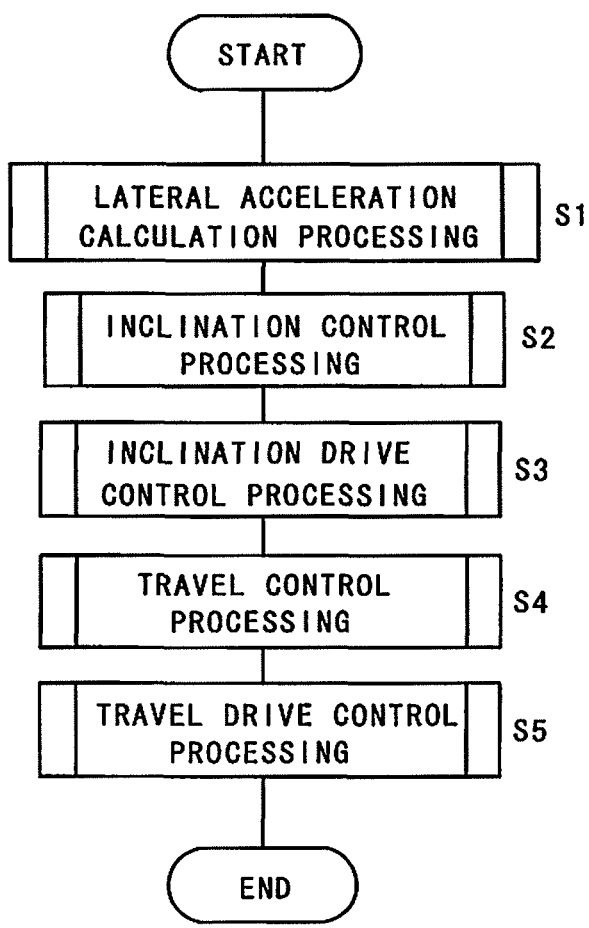
FIG. 6 Main flowchart showing operation of a control section according to the first embodiment of the present invention.
Figure 7:
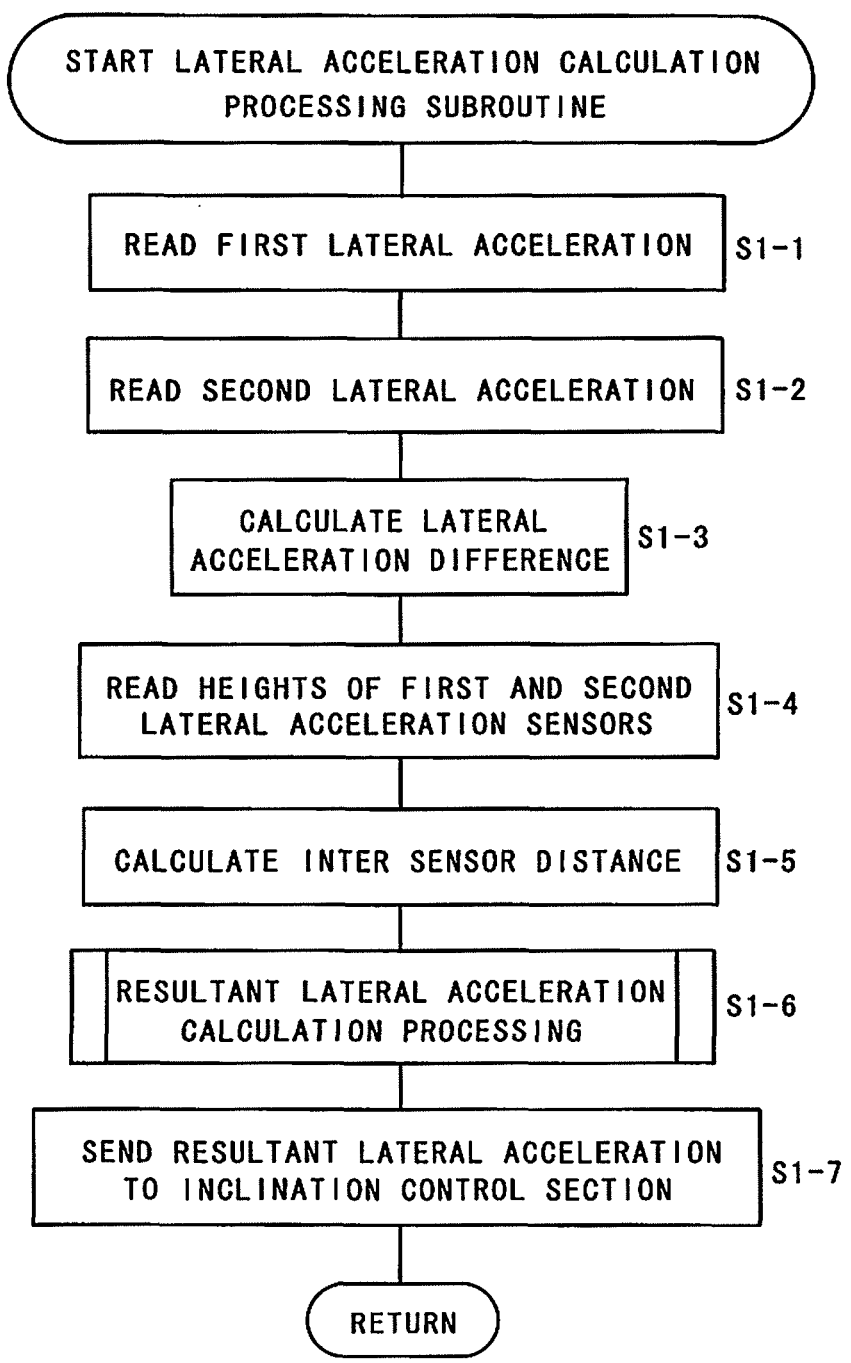
FIG. 7 Flowchart showing a subroutine of lateral acceleration calculation processing according to the first embodiment of the present invention.

FIG. 6 is a main flowchart showing operation of a control section according to the first embodiment of the present invention. FIG. 7 is a flowchart showing a subroutine of lateral acceleration calculation processing according to the first embodiment of the present invention.

Figure 8:
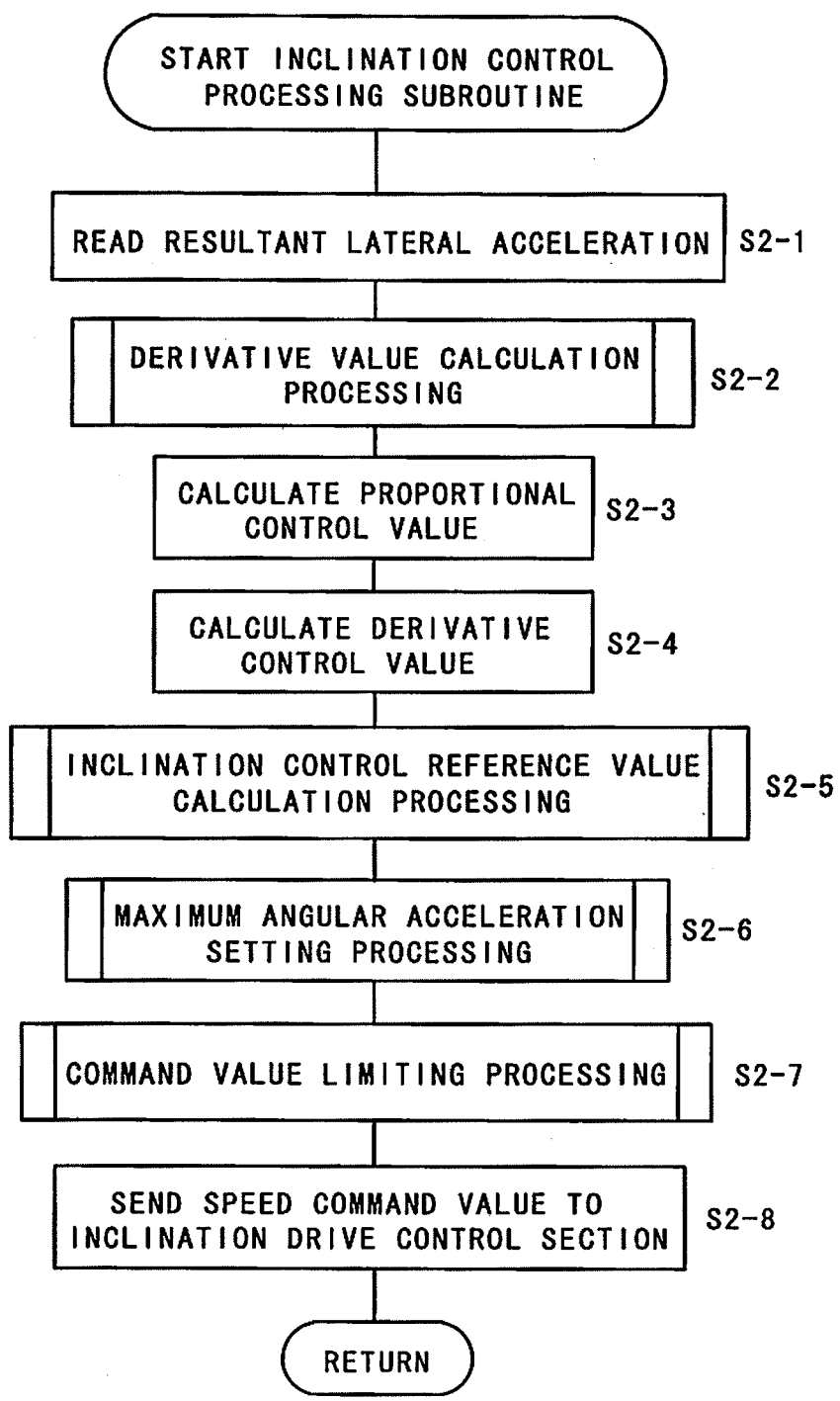
FIG. 8 Flowchart showing a subroutine of inclination control processing according to the first embodiment of the present invention.
Figure 9:
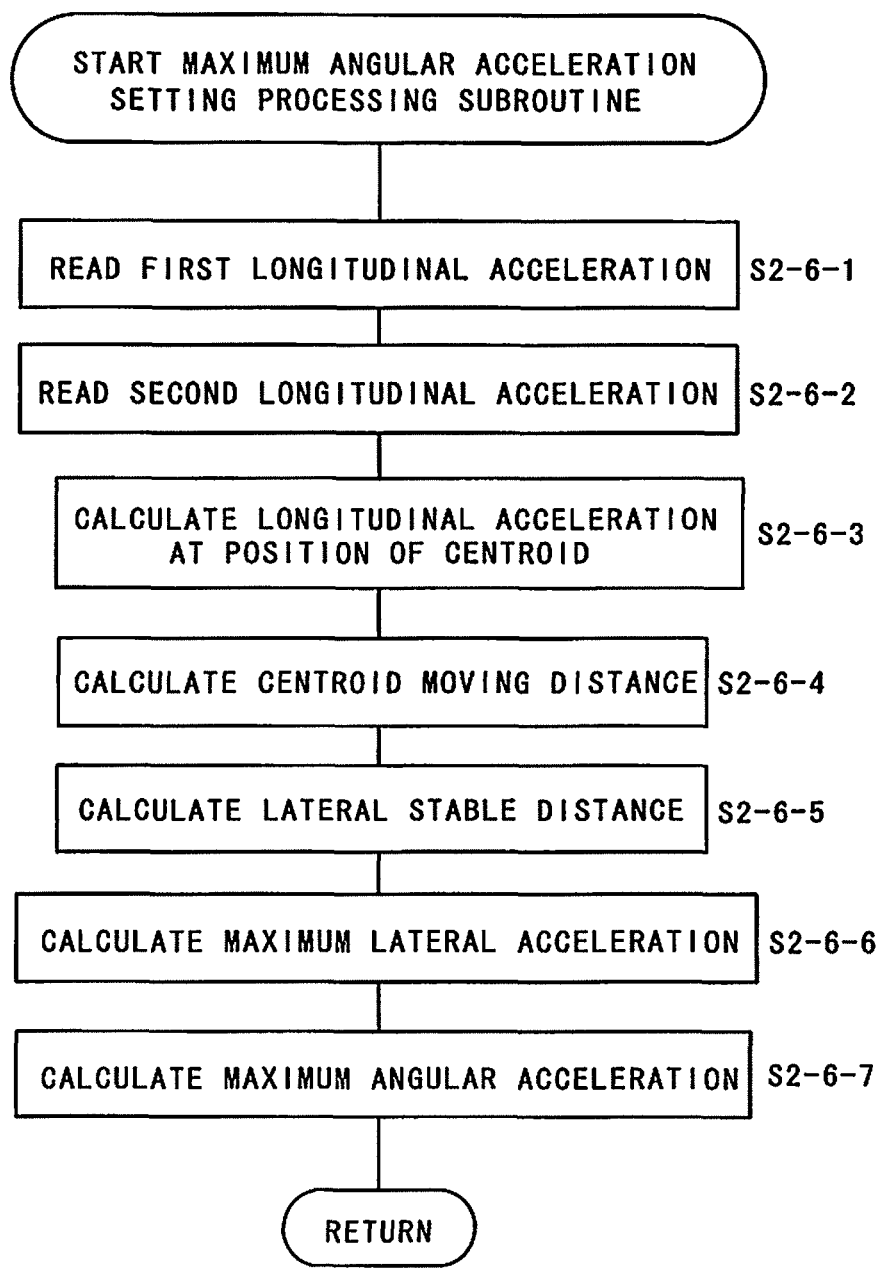
FIG. 9 Flowchart showing a subroutine of maximum angular acceleration setting processing according to the first embodiment of the present invention.
Figure 10:
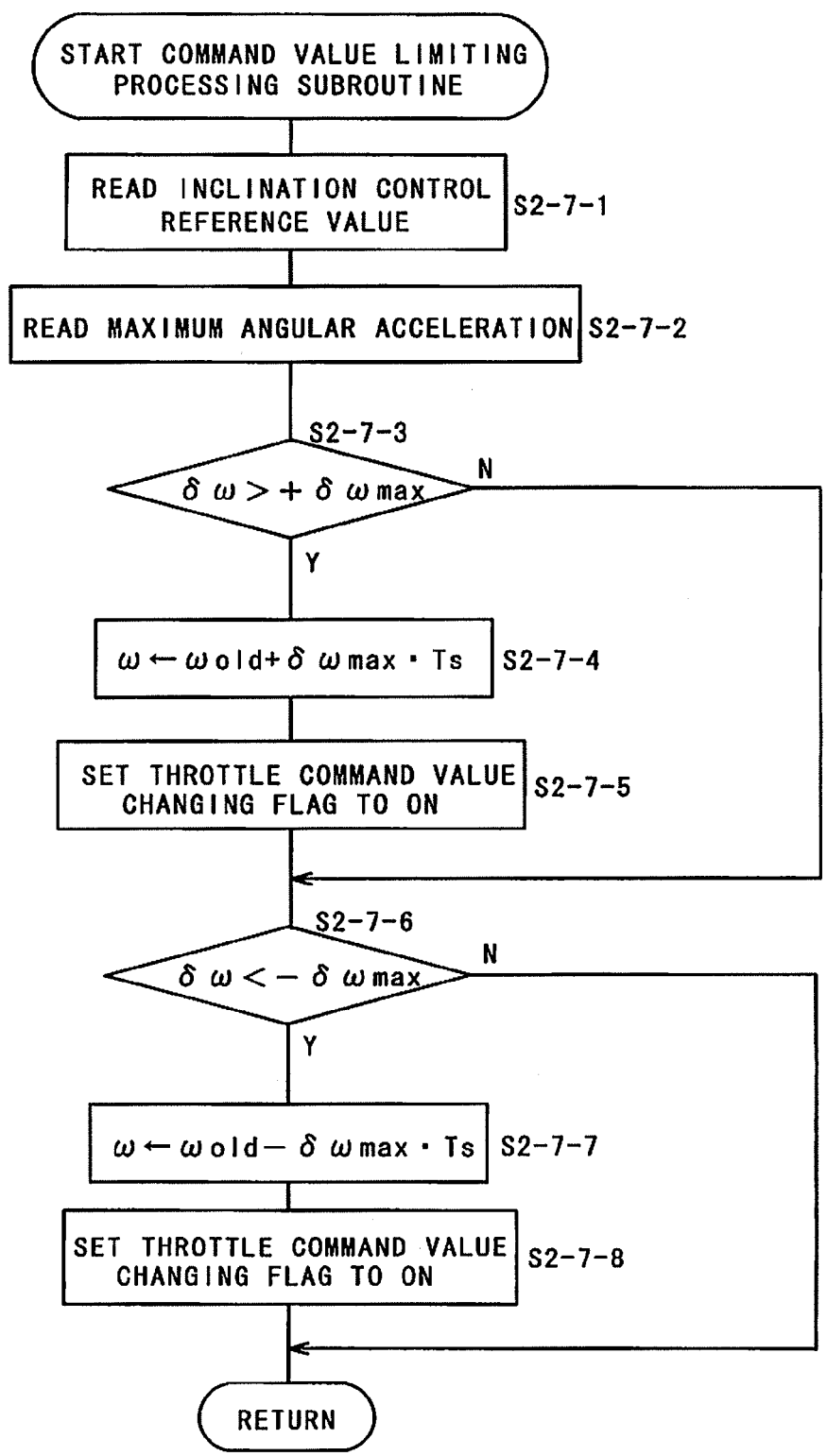
FIG. 10 Flowchart showing a subroutine of command value limiting processing according to the first embodiment of the present invention.
Figure 11:
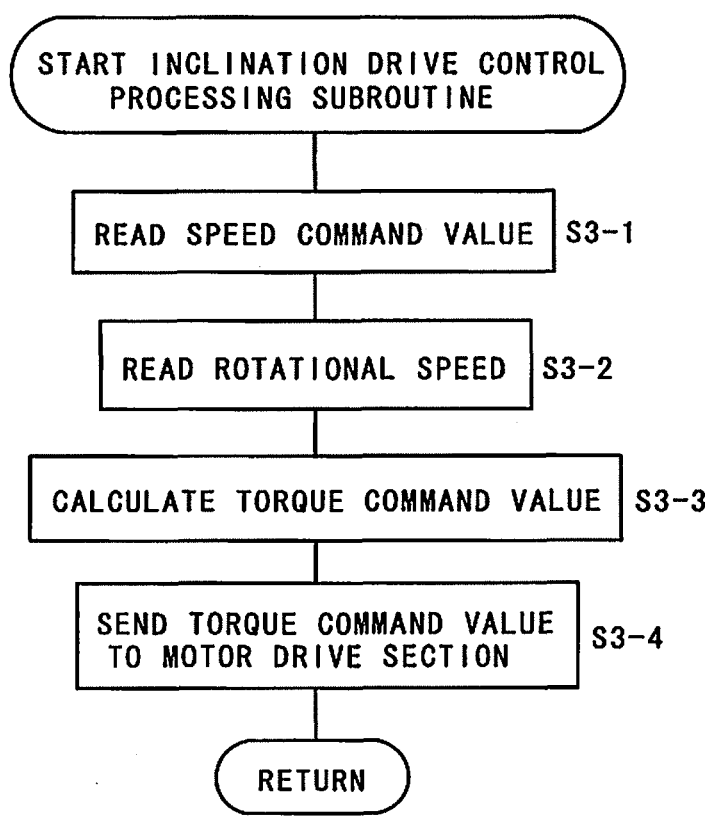
FIG. 11 Flowchart showing a subroutine of inclination drive control processing according to the first embodiment of the present invention.
Figure 12:
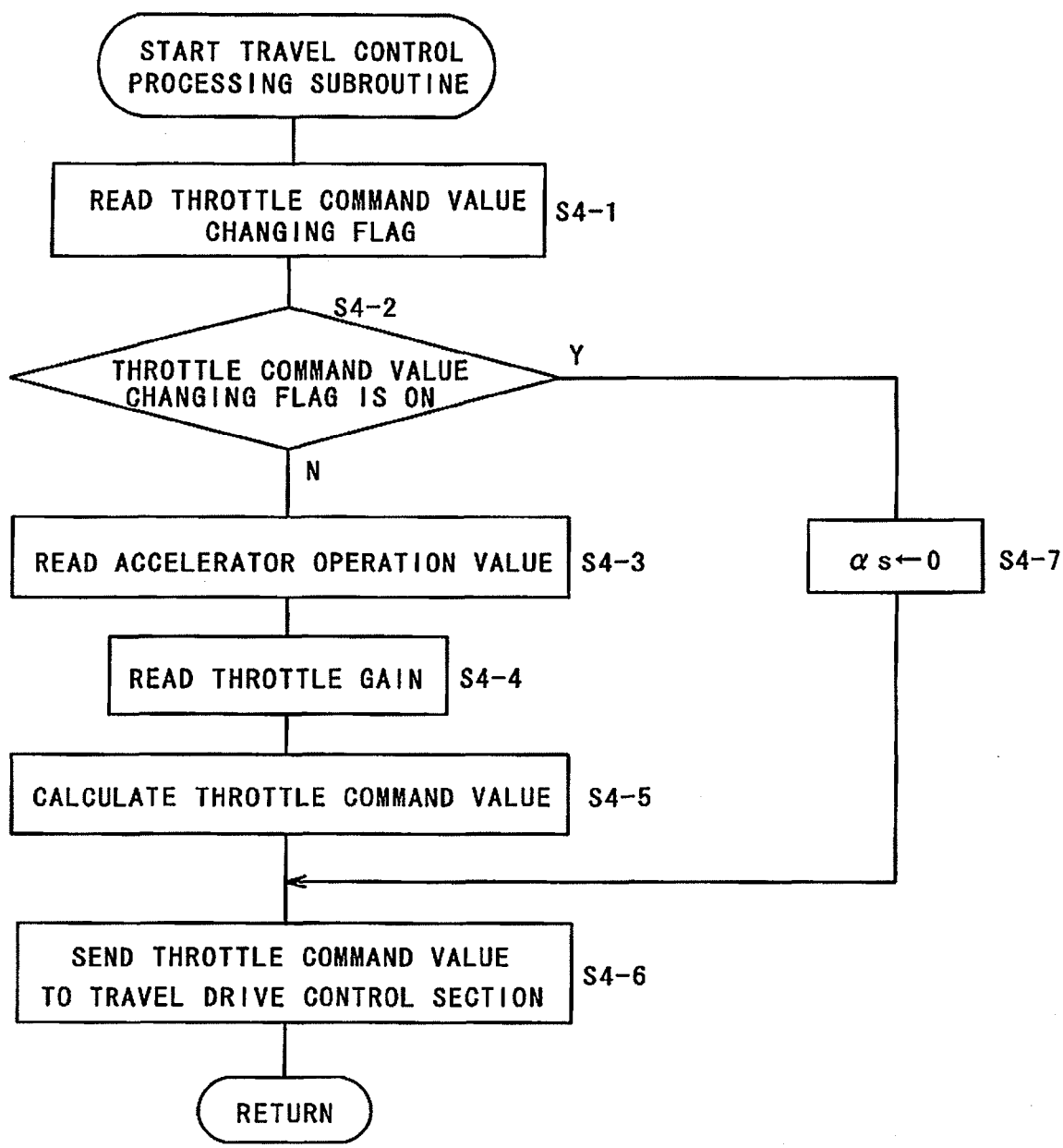
FIG. 12 Flowchart showing a subroutine of travel control processing according to the first embodiment of the present invention.
Figure 13:
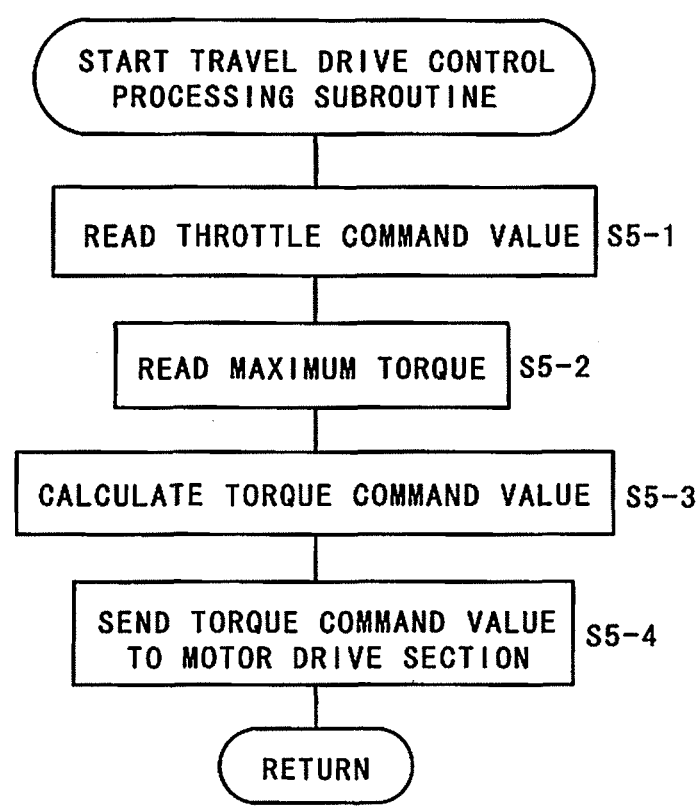
FIG. 13 Flowchart showing a subroutine of travel drive control processing according to the first embodiment of the present invention.
Figure 14:
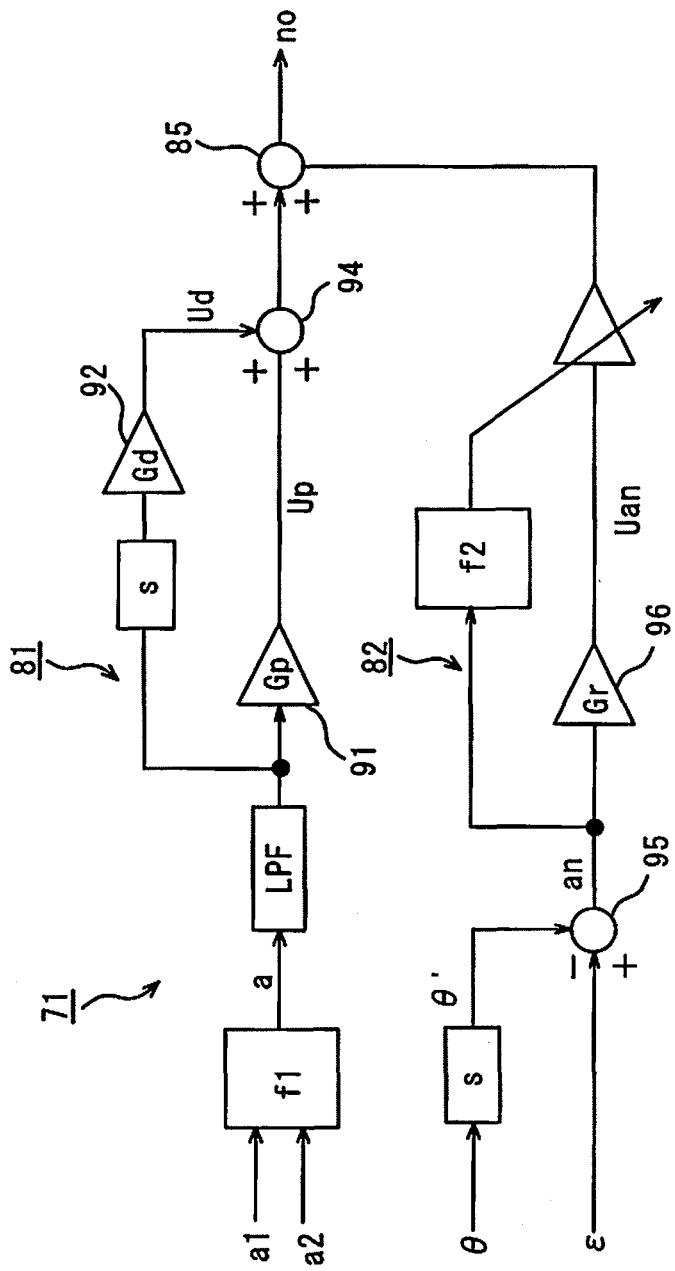
FIG. 14 Control block diagram of an inclination control section according to the first embodiment of the present invention.
Figure 15:
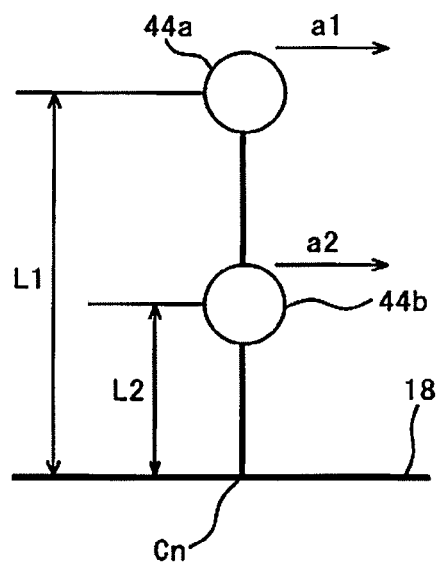
FIG. 15 Conceptual view used for describing a method of calculating resultant lateral acceleration according to the first embodiment of the present invention.
Figure 16:
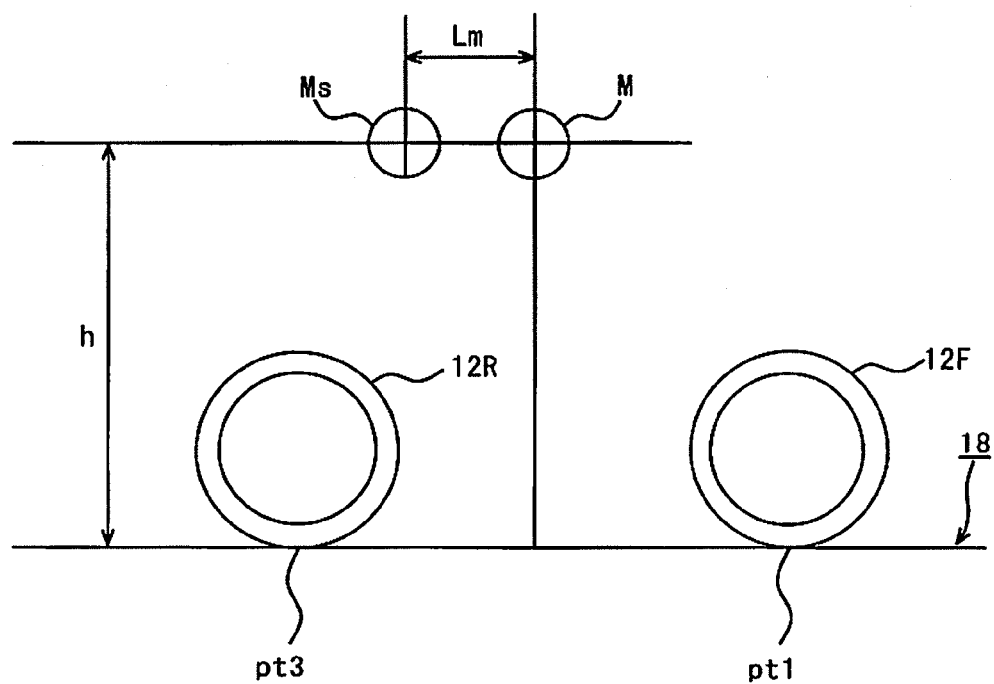
FIG. 16 First view used for describing the position of the centroid of the tricycle according to the first embodiment of the present invention.
Figure 17:
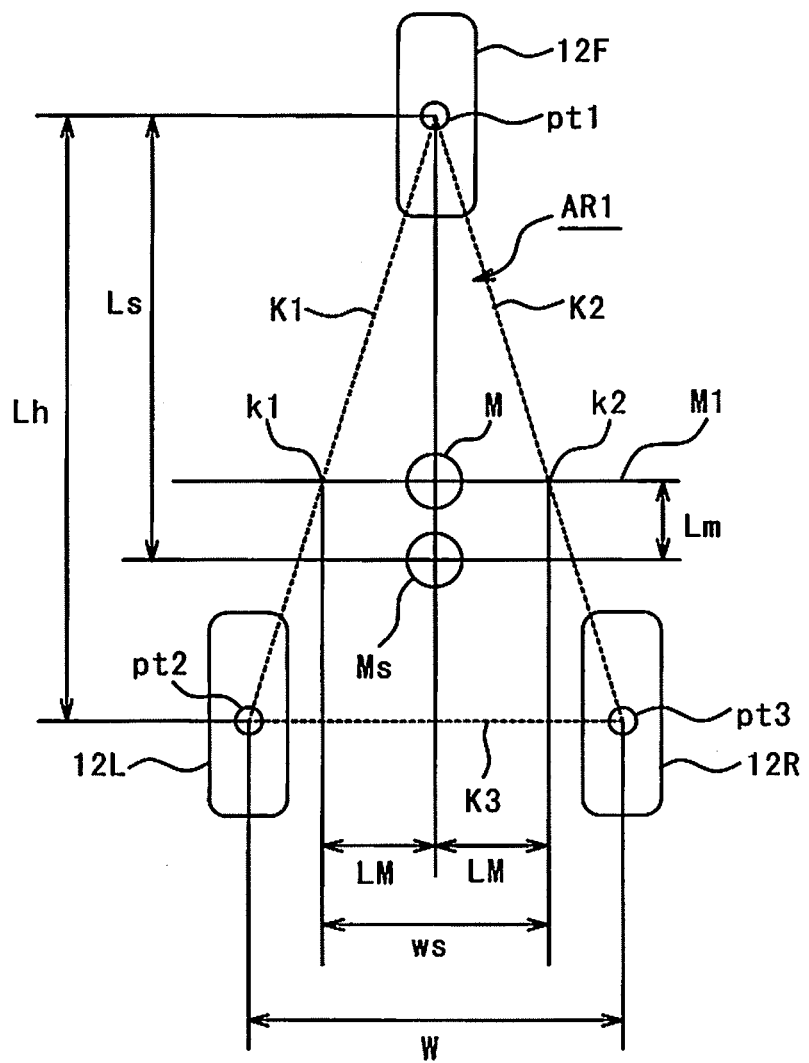
FIG. 17 Second view used for describing the position of the centroid of the tricycle according to the first embodiment of the present invention.
Figure 18:
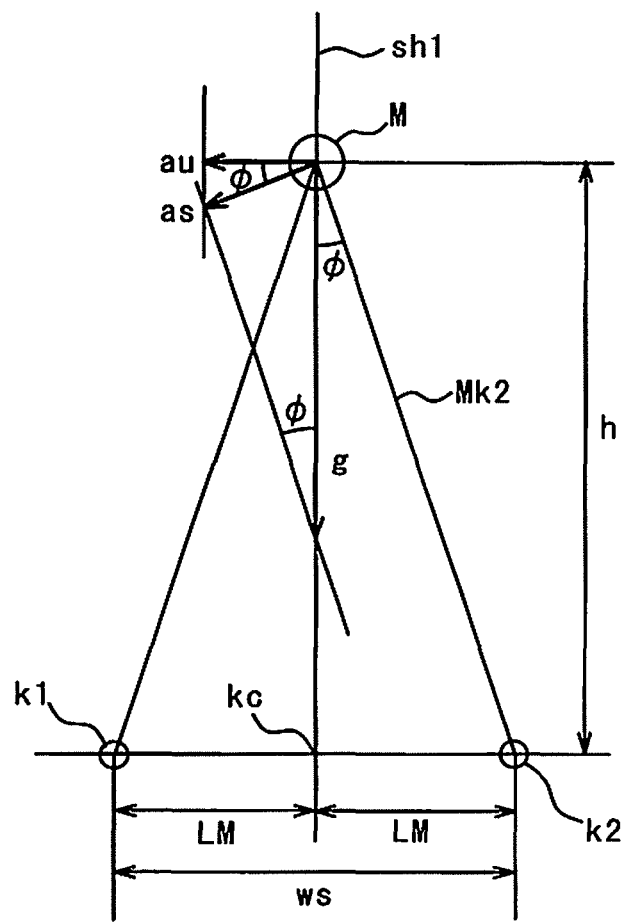
FIG. 18 View used for describing a method of calculating the maximum angular acceleration according to the first embodiment of the present invention.

FIG. 8 is a flowchart showing a subroutine of inclination control processing according to the first embodiment of the present invention. FIG. 9 is a flowchart showing a subroutine of maximum angular acceleration setting processing according to the first embodiment of the present invention. FIG. 10 is a flowchart showing a subroutine of command value limiting processing according to the first embodiment of the present invention. FIG. 11 is a flowchart showing a subroutine of inclination drive control processing according to the first embodiment of the present invention. FIG. 12 is a flowchart showing a subroutine of travel control processing according to the first embodiment of the present invention. FIG. 13 is a flowchart showing a subroutine of travel drive control processing according to the first embodiment of the present invention. FIG. 14 is a control block diagram of an inclination control section according to the first embodiment of the present invention. FIG. 15 is a conceptual view used for describing a method of calculating resultant lateral acceleration according to the first embodiment of the present invention. FIG. 16 is a first view used for describing the position of the centroid of the tricycle according to the first embodiment of the present invention. FIG. 17 is a second view used for describing the position of the centroid of the tricycle according to the first embodiment of the present invention. FIG. 18 is a view used for describing a method of calculating the maximum angular acceleration according to the first embodiment of the present invention.

First, the lateral acceleration computation section 65 performs lateral acceleration calculation processing so as to read (acquire) the first and second lateral accelerations a1 and a2 from the first lateral acceleration sensor 44a and the second lateral acceleration sensor 44b, calculate the above-mentioned resultant lateral acceleration a (the lateral acceleration for inclination control) on the basis of the first and second lateral accelerations a1 and a2, and send the resultant lateral acceleration a to the inclination control section 71 (step S1). Next, the inclination control section 71 performs inclination control processing so as to read the resultant lateral acceleration a from the lateral acceleration computation section 65, generate the above-mentioned speed command value no on the basis of the resultant lateral acceleration a, and send the speed command value no to the inclination drive control section 72 (step S2).

Next, the inclination drive control section 72 performs inclination drive control processing so as to read the speed command value no from the inclination control section 71, read the rotational speed NK from the speed sensor 58, generate the above-mentioned torque command value To* on the basis of the speed command value no and the rotational speed NK, and send the torque command value To* to the motor drive section 57 to thereby drive the link motor 25 (step S3).

The travel control section 73 then performs travel control processing so as to read the above-mentioned accelerator operation value α from the accelerator sensor 45, generate the above-mentioned throttle command value αs on the basis of the accelerator operation value α, and send the throttle command value αs to the travel drive control section 74 (step S4).

Subsequently, the travel drive control section 74 performs travel drive control processing so as to read the throttle command value αs from the travel control section 73, generate, on the basis of the throttle command value αs, the above-mentioned torque command value Ts* for driving the drive motors 51L and 51R, and send the torque command value Ts* to the motor drive section 59 to thereby drive the drive motors 51L and 51R (step S5).

Next, operation of the lateral acceleration calculation processing means will be described with reference to FIGS. 7 and 15.

First, the lateral acceleration computation section 65 reads the first and second lateral accelerations a1 and a2 (steps S1-1 and S1-2), and calculates a lateral acceleration difference Δa which represents the difference between the first and second lateral accelerations a1 and a2 (Δa=a1−a2) (step S1-3).

Next, the lateral acceleration computation section 65 reads (acquires) from the ROM the heights L1 and L2 of the first lateral acceleration sensor 44a and the second lateral acceleration sensor 44b (step S1-4), and calculates the distance between the first lateral acceleration sensor 44a and the second lateral acceleration sensor 44b along the height direction axis sh1; i.e., the inter-sensor distance ΔL (ΔL=L1−L2) (step S1-5). The heights L1 and L2 are recorded in the ROM in advance. Notably, the inter-sensor distance ΔL may be calculated and recorded in the ROM in advance.

Subsequently, unillustrated resultant lateral acceleration calculation processing means of the lateral acceleration computation section 65 performs resultant lateral acceleration calculation processing so as to calculate the above-mentioned resultant lateral acceleration a from the second lateral acceleration a2, the height L2, the inter-sensor distance ΔL, and the lateral acceleration difference Δa in accordance with Expression (1), and records it in the RAM (step S1-6).

$$a = a2 - (L2/\Delta L) \cdot \Delta a \quad (1)$$

Notably, the above-mentioned resultant lateral acceleration a may be calculated from the first lateral acceleration a1, the height L1, the inter-sensor distance ΔL, and the lateral acceleration difference Δa in accordance with Expression (2).

$$a = a1 - (L1/\Delta L) \cdot \Delta a \quad (2)$$

In this case, when the above-mentioned resultant lateral acceleration a is calculated in accordance with each of Expressions (1) and (2), theoretically, the same value is obtained. However, the lateral acceleration which acts on the tricycle 10 due to a displacement in the circumferential direction when the tricycle 10 is inclined is proportional to the distance from the roll center Cn on the road surface 18 shown in FIG. 15. Therefore, in actuality, from the viewpoint of restraining superimposition of noise on the lateral acceleration, it is desired that the resultant lateral acceleration a be calculated, with the second lateral acceleration a2, which is detected by the second lateral acceleration sensor 44b closer to the roll center Cn, being used as a reference. In view of this, in the present embodiment, the resultant lateral acceleration a is calculated in accordance with Expression (1).

The lateral acceleration computation section 65 then sends the calculated resultant lateral acceleration a to the inclination control section 71 (step S1-7).

Next, operation of the inclination control processing means will be described with reference to FIG. 8.

First, unillustrated lateral acceleration acquisition processing means of the inclination control section 71 performs lateral acceleration acquisition processing so as to read the resultant lateral acceleration a from the lateral acceleration computation section 65 (step S2-1).

Subsequently, unillustrated derivative value calculation processing means of the inclination control section 71 performs derivative value calculation processing so as to read from the RAM the resultant lateral acceleration aold recorded at the time of previous inclination control, read the control period Ts, and calculate the derivative value δa of the resultant lateral acceleration a (δa=da/dt=(a−aold)/Ts), and record it in the RAM (step S2-2). Notably, the initial value of the resultant lateral acceleration aold is zero.

Subsequently, unillustrated proportional control value calculation processing means (first control value calculation processing means) of the inclination control section 71 performs proportional control value calculation processing (first control value calculation processing) so as to calculate a proportional control value Up (a first control value) on the basis of a proportional gain Gp (a control gain for proportional control) and the resultant lateral acceleration a (Up=Gp·a) (step S2-3).

Next, unillustrated derivative control value calculation processing means (second control value calculation processing means) of the inclination control section 71 performs derivative control value calculation processing (second control value calculation processing) so as to calculate a derivative control value Ud (a second control value) on the basis of a derivative gain Gd (a control gain for derivative control) and the derivative value δa (Ud=Gd·δa) (step S2-4).

Subsequently, unillustrated inclination control reference value calculation processing means (third control value calculation processing means) of the inclination control section 71 performs inclination control reference value calculation processing (third control value calculation processing) so as to read the proportional control value Up and the derivative control value Ud, and add the proportional control value Up and the derivative control value Ud together to thereby calculate an inclination control reference value Upd (a third control value) (Upd=Up+Ud) (step S2-5).

Incidentally, when the inclination control reference value Upd is sent to the inclination drive control section 72 as a speed command value so as to drive the link motor 25 for inclination control, the tricycle 10 can be inclined by an angle corresponding to the centrifugal force.

However, when one of the wheels 12L and 12R lifts from the road surface 18 or falls into a hollow, the tricycle 10 may be inclined beyond an operation limit determined by the geometry, position of centroid, etc. of the tricycle 10. In such a case, it becomes unable to travel the tricycle 10 stably, and the driver feels an unnatural sensation.

For example, when the tricycle 10 is caused to travel on a downhill road or when the tricycle 10 is braked, the centroid of the tricycle 10 moves forward. If inclination control is performed in such a state and the centroid deviates from a contact point region which is a triangular region formed by connecting three ground contact points at which the wheels 12F, 12L, and 12R are in contact with the road surface 18, the tricycle 10 cannot be traveled stably, and the driver feels an unnatural sensation.

In order to solve such a problem, unillustrated maximum angular acceleration setting processing means of the inclination control section 71 performs maximum angular acceleration setting processing so as to calculate a maximum angular acceleration at which the tricycle 10 can be inclined and which is determined by the geometry, position of centroid, etc. of the tricycle 10; i.e., a maximum angular acceleration δωmax (step S2-6), and unillustrated command value limiting processing means (control value limiting processing means) of the inclination control section 71 performs command value limiting processing (control value limiting processing) so as to calculate a speed command value no whose variation is limited, on the basis of the maximum angular acceleration δωmax and the inclination control reference value Upd (step S2-7). Notably, the maximum angular acceleration δωmax is set so as to prevent the tricycle 10 from overturning, which would otherwise occur when the centroid of the tricycle 10 moves, and one of the wheels 12L and 12R; for example, the wheel 12R lifts from the road surface 18 and falls into a hollow, whereby the tricycle 10 is displaced in the lateral direction. The maximum angular acceleration δωmax is set such that it corresponds to the movement of the centroid, and represents a limit angular acceleration at the centroid.

Subsequently, unillustrated inclination control output processing means of the inclination control section 71 performs output processing for inclination control so as to output the variation-limited speed command value no to the inclination drive control section 72 (step S2-8).

Next, operation of the maximum angular acceleration setting processing means will be described with reference to FIG. 9 and FIGS. 16 to 18.

In FIGS. 16 and 17, M represents the centroid of the tricycle 10; pt1 to pt3 represent the ground contact points at which the wheels 12F, 12L, and 12R are in contact with the road surface 18; and AR1 represents a contact point region formed by connecting the points pt1 to pt3. The contact point region AR1 forms an isosceles triangle defined by a line segment (left side) K1 extending between the ground contact points pt1 and pt2, a line segment (right side) K2 extending between the ground contact points pt1 and pt3, and a line segment (base) K3 extending between the ground contact points pt2 and pt3. Notably, in the present embodiment, the centroid M is the centroid determined in consideration of not only the weight of the tricycle 10 itself, but also the weight of the driver and the weight of a load loaded on the vehicle.

Incidentally, when the tricycle 10 is caused to travel, it is preferred that the centroid M be located within the contact point region AR1. As described above, if the centroid M deviates from the contact point region AR1, the tricycle 10 cannot be traveled stably, and the driver feels an unnatural sensation.

In order to solve such a problem, in the present embodiment, the maximum angular acceleration setting processing means calculates the maximum angular acceleration $\delta\omega max$ such that, when inclination control is being performed, the centroid M does not deviate from the contact point region AR1.

For such operation, information acquisition processing means of the maximum angular acceleration setting processing means performs information acquisition processing so as to read (acquire) the first longitudinal acceleration b1 detected by the first longitudinal acceleration sensor 50a and the second longitudinal acceleration b2 detected by the second longitudinal acceleration sensor 50b (steps S2-6-1 and S2-6-2), and longitudinal acceleration calculation processing means of the maximum angular acceleration setting processing means performs longitudinal acceleration calculation processing so as to calculate the acceleration in the front-rear direction (i.e., longitudinal acceleration) of the tricycle 10 at the position of the centroid M (step S2-6-3).

In this case, when the height of the centroid M; i.e., the centroid height, is represented by h, the longitudinal acceleration bm at the centroid M can be represented by the following expression, because the first longitudinal acceleration sensor 50a and the second longitudinal acceleration sensor 50b are disposed at the positions whose heights (the distance from the road surface 18 in the gravitational direction) are L1 and L2.

$$bm=(b1-b2)\cdot h/(L1-L2)+b1-(b1-b2)L1/(L1-L2)$$

Subsequently, centroid moving distance calculation processing means (centroid moving amount calculation processing means) of the maximum angular acceleration setting processing means performs centroid moving distance calculation processing (centroid moving amount calculation processing) so as to calculate a moving distance (moving amount) from the initial position Ms of the centroid M in the front-rear direction at the time when the longitudinal acceleration bm acts on the tricycle 10; i.e., a centroid moving distance Lm (step S2-6-4).

In this case, when the gravitational acceleration is represented by g (9.80665 m/s$^2$), the centroid moving distance Lm is represented by the following expression.

$$Lm=bm\cdot h/g$$

Notably, the initial position Ms of the centroid M is the position of the centroid when the tricycle 10 is stopped or when the tricycle 10 is traveled on a horizontal road at a constant speed. Also, each of the longitudinal acceleration bm and the centroid moving distance Lm at the time when the tricycle 10 is decelerated assumes a positive value.

Next, lateral stable distance calculation processing means of the maximum angular acceleration setting processing means performs lateral stable distance calculation processing so as to calculate, on the basis of the centroid moving distance Lm, a lateral stable distance ws which represents a moving amount by which the centroid M can move in the width direction of the tricycle 10 (lateral direction) when the tricycle 10 is inclined by the inclination control (step S2-6-5).

In this case, the intersections between the line segments K1 and K2 and a line segment Ml which passes through the centroid M, is parallel to the line segment K3, and intersects the line segments K1 and K2 are referred to as pivoting fulcrums k1 and k2. The region between the pivoting fulcrums k1 and k2 is referred to as a lateral stable region, and the distance between the pivoting fulcrums k1 and k2 is referred to as the lateral stable distance ws.

The lateral stable distance ws is calculated on the basis of the distance Lh between the front and rear wheels, a tread W which is the distance between the wheels 12L and 12R, and a distance Ls from the ground contract point pt1 to the initial position Ms.

$$ws=(Ls-Lm)W/Lh$$

Subsequently, maximum lateral acceleration calculation processing means of the maximum angular acceleration setting processing means performs maximum lateral acceleration calculation processing so as to calculate a permitted maximum lateral acceleration ±as for the case where one of the wheels 12L and 12R lifts from the road surface 18 or falls into a hollow, whereby the tricycle 10 is displaced in the lateral direction (step S2-6-6).

For example, in the case where the tricycle 10 inclines due to a leftward displacement thereof, as shown in FIG. 18, the maximum lateral acceleration ±as is represented by a component of the gravitational acceleration g along a direction perpendicular to a line segment Mk2 which extends between the centroid M and the pivoting fulcrum k2, which serves as a pivot center (pivot leg).

When the center point between the pivoting fulcrums k1 and k2 is represented by kc, the distance LM between the center point kc and each of the pivoting fulcrums k1 and k2 is calculated from an expression LM=ws/2. Therefore, the angle $\phi$ between the line segment Mk2 extending from the centroid M and the height direction axis sh1 of the tricycle (a vertical line) is calculated from an expression $\phi=\tan^{-1}$ (LM/h), and the maximum lateral acceleration as is calculated from an expression as=g·sin $\phi$.

Subsequently, maximum angular acceleration calculation processing means (maximum lateral acceleration conversion processing means) of the maximum angular acceleration setting processing means performs maximum angular acceleration calculation processing (maximum lateral acceleration conversion processing) so as to convert the maximum lateral acceleration as to a lateral acceleration along the height direction axis sh1; i.e., an inclination-time maximum lateral acceleration au (au=as·cos $\phi$), and calculate the above-mentioned maximum angular acceleration δωmax on the basis of the inclination-time maximum lateral acceleration au (δωmax=au/h) (step S2-6-7).

In the above-described manner, the maximum angular acceleration δωmax can be calculated and set such that it corresponds to the centroid moving distance Lm.

Next, operation of the above-mentioned command value limiting processing means will be described with reference to FIG. 10.

First, information acquisition processing means of the above-mentioned command value limiting processing means performs information acquisition processing so as to read the inclination control reference value Upd and the maximum angular acceleration δωmax (steps S2-7-1 and S2-7-2), and derivative value calculation processing means of the command value limiting processing means performs derivative value calculation processing so as to differentiate angular velocity ω which represents the inclination control reference value Upd. For such an operation, the derivative value calculation processing means reads the previous angular velocity ωold from the RAM, reads the control period Ts, and calculates the derivative value of the angular velocity ω; i.e., the angular acceleration δω.

$$δω=dω/dt=(ω-ωold)/Ts$$

Subsequently, command value limiting condition determination processing means of the above-mentioned command value limiting processing means performs command value limiting condition determination processing so as to determine whether or not a command value limiting condition is satisfied by determining whether or not the absolute value |δω| of the angular acceleration δω is greater than the maximum angular acceleration δωmax.

Namely, the command value limiting condition determination processing means determines whether or not a first condition is satisfied by determining whether or not the angular acceleration δφ satisfies a relation δω>+δωmax (step S2-7-3). When the first condition is satisfied, it is determined that the above-mentioned command value limiting condition is satisfied. In this case, angular velocity changing processing means of the command value limiting processing means performs angular velocity changing processing so as to change the angular velocity ω in accordance with an expression ω=ωold+δωmax·Ts, to thereby prevent the angular velocity ω from increasing sharply, and limit a variation of the speed command value no represented by the angular velocity ω (step S2-7-4). Then, throttle command value changing processing means of the command value limiting processing means performs throttle command value changing processing so as to set a throttle command value changing flag to an "ON" state, to thereby limit a variation of the throttle command value (step S2-7-5). Notably, the angular velocity changing processing means constitutes first control value limiting processing means which limits the control value for inclination control, and the throttle command value changing processing means constitutes second control value limiting processing means which limits the control value for travel control.

Also, the above-mentioned command value limiting condition determination processing means determines whether or not a second condition is satisfied by determining whether or not the angular acceleration δω satisfies a relation δω<-δωmax (step S2-7-6). When the second condition is satisfied, it is determined that the above-mentioned command value limiting condition is satisfied. In this case, the angular velocity changing processing means changes the angular velocity ω in accordance with an expression ω=ωold--δωmax·Ts, to thereby prevent the angular velocity ω from decreasing sharply, and limit a variation of the above-mentioned speed command value no (step S2-7-7). Then, the throttle command value changing processing means sets the throttle command value changing flag to an "ON" state, to thereby limit a variation of the throttle command value (step S2-7-8).

Namely, in the case where the angular acceleration δω satisfies a relation −δωmax≤δω≤+δωmax and the first and second conditions are not satisfied, the command value limiting condition determination processing means determines that the command value limiting condition is not satisfied, and the angular velocity changing processing means uses the angular velocity ω as it is, and does not limit the variation of the speed command value no. Also, in this case, the throttle command value changing processing means does not set the throttle command value changing flag to an "ON" state, and does not limit the variation of the throttle command value.

Next, operation of the inclination drive control processing means will be described with reference to FIG. 11.

First, unillustrated information acquisition processing means of the inclination drive control section 72 performs information acquisition processing so as to read the speed command value no from the inclination control section 71 and read the rotational speed NK from the speed sensor 58 (steps S3-1 and S3-2). Subsequently unillustrated inclination control command value calculation processing means of the inclination drive control section 72 performs command value calculation processing for inclination control so as to calculate the deviation Δno between the speed command value no and the rotational speed NK, and calculate a torque command value To* on the basis of a gain Gpo (a control gain for inclination drive control) and the deviation Δno (To*=Gpo·Δno (step S3-3).

Subsequently, unillustrated inclination drive control output processing means of the inclination drive control section 72 performs output processing for inclination drive control so as to send the torque command value To* to the motor drive section 57 (step S3-4).

As described above, the resultant lateral acceleration a is calculated on the basis of the first and second lateral accelerations a1 and a2, the speed command value no is calculated on the basis of the resultant lateral acceleration a, the torque command value To* is calculated on the basis of the deviation Δno between the speed command value no and the rotational speed NK of the link motor 25, and the link motor 25 is driven on the basis of the torque command value To*. Accordingly, feedback control for the link motor 25 is performed such that the resultant lateral acceleration a becomes zero, whereby the tricycle 10 can be inclined toward the turning center by an angle corresponding to the centrifugal force, disturbance, etc. Accordingly, the resultant lateral acceleration acting on the tricycle 10 becomes zero, whereby the turning stability of the vehicle can be enhanced.

Next, operation of the travel control processing means will be described with reference to FIG. 12.

First, unillustrated information acquisition processing means of the travel control section 73 performs information acquisition processing so as to read (acquire) the throttle command value changing flag from the inclination control section 71 (step S4-1).

Next, unillustrated limitation necessity determination processing means of the travel control section 73 performs limitation necessity determination processing so as to determine whether or not the throttle command value changing flag is in the "ON" state (step S4-2). In the case where the throttle command value changing flag is in the "ON" state, throttle command value changing processing means of the travel control section 73 performs throttle command value changing processing so as to change the throttle command value αs to 0 (step S4-7).

In the case where the throttle command value changing flag is not in the "ON" state, the information acquisition processing means reads (acquires) the accelerator operation value α from the accelerator sensor 45, and reads (acquires) a throttle gain Gth from the ROM (steps S4-3 and S4-4). Unillustrated throttle command value calculation processing means (serving as control value calculation processing means and drive force restraining processing means) of the travel control section 73 performs throttle command value calculation processing (serving as control value calculation processing and drive force restraining processing) so as to calculate the above-mentioned throttle command value αs (αs=Gth·α) (step S4-5).

Then, unillustrated travel control output processing means of the travel control section 73 performs output processing for travel control so as to send the throttle command value αs to the travel drive control section 74 (step S4-6).

Next, operation of the travel drive control processing means will be described with reference to FIG. 13.

First, unillustrated information acquisition processing means of the travel drive control section 74 performs information acquisition processing so as to read the throttle command value αs from the travel control section 73 and read from the ROM a maximum torque Tmax which is an intrinsic value to the drive motors 51L and 51R (steps S5-1 and S5-2). Subsequently, unillustrated travel control command value calculation processing means of the travel drive control section 74 performs command value calculation processing for travel control so as to calculate a torque command value Ts* on the basis of a gain Gps (a control gain for travel drive control) and the maximum torque Tmax (Ts*=Gps·Tmax) (step S5-3).

Subsequently, unillustrated travel drive control output processing means of the travel drive control section 74 performs output processing for travel drive control so as to send the torque command value Ts* to the motor drive section 59 (step S5-4).

As described above, in the present embodiment, in the case where the centroid M of the tricycle 10 moves forward as a result of, for example, the tricycle 10 being traveled on a downhill road or the tricycle 10 being braked, the centroid moving distance Lm is calculated, the maximum angular acceleration δωmax at the centroid M is calculated such that it corresponds to the centroid moving distance Lm, and the speed command value no is limited on the basis of the maximum angular acceleration δωmax. Therefore, even when one of the wheels 12L and 12R lifts from the road surface 18 or falls into a hollow, the tricycle 10 is not inclined beyond the operation limit determined by the geometry, position of centroid, etc. of the tricycle 10.

Accordingly, the tricycle 10 can travel stably, and the driver does not feel any unnatural sensation.

Next, a control system which constitutes the inclination control section 71 will be described with reference to FIG. 14.

As shown in FIG. 14, the inclination control section 71 includes first and second control systems 81 and 82, and an adder 85. The first control system 81 performs feedback control, and the second control system 82 performs feedforward control.

The first control system 81 calculates the resultant lateral acceleration a on the basis of the first and second lateral accelerations a1 and a2, calculates the proportional control value Up on the basis of the resultant lateral acceleration a and the proportional gain Gp, and calculates the derivative control value Ud on the basis of the resultant lateral acceleration a and the derivative gain Gd. For these calculations, the first control system 81 includes a transfer function f1, a filter LPF, multipliers 91 and 92, a differentiator s, and an adder 94. The transfer function f1 calculates the resultant lateral acceleration a in accordance with the above-mentioned Expression (1).

Also, the second control system 82 calculates a disturbance component an on the basis of the link angle θ and the roll rate ε, and calculates a disturbance control value Uan on the basis of the disturbance component an and a gain Gr for disturbance control. For these calculations, the second control system 82 includes a differentiator s, a subtracter 95, a multiplier 96, and a transfer function f2. The subtracter 95 subtracts, from the roll rate ε, a link angular velocity θ' which represents a change rate of the link angle θ.

The transfer function f2 performs rewind control (i.e., wind-down control) which is a control performed in consideration of elastic deformations of elastic members such as tires, relevant portions of the vehicle main body Bd, and springs of the suspensions.

The wind-down control is performed only during a period between a point in time when each elastic member receives a disturbance and starts its elastic deformation and a point in time when the elastic member ends the elastic deformation, and is not performed after the elastic member has started to restore by its elasticity.

Specifically, unillustrated wind-down control processing means of the inclination control section 71 performs wind-down control processing so as to invert the polarity of a predetermined control value (e.g., the speed command value no) during the period between a point in time when each elastic member receives a disturbance and starts its elastic deformation and a point in time when the elastic member ends the elastic deformation.

Next, a second embodiment of the present invention will be described. Notably, components having the same structures as those in the first embodiment are denoted by the same reference numerals. For the effect that the second embodiment yields through employment of the same structure, the description of the effect of the first embodiment is incorporated herein by reference.

Figure 19:
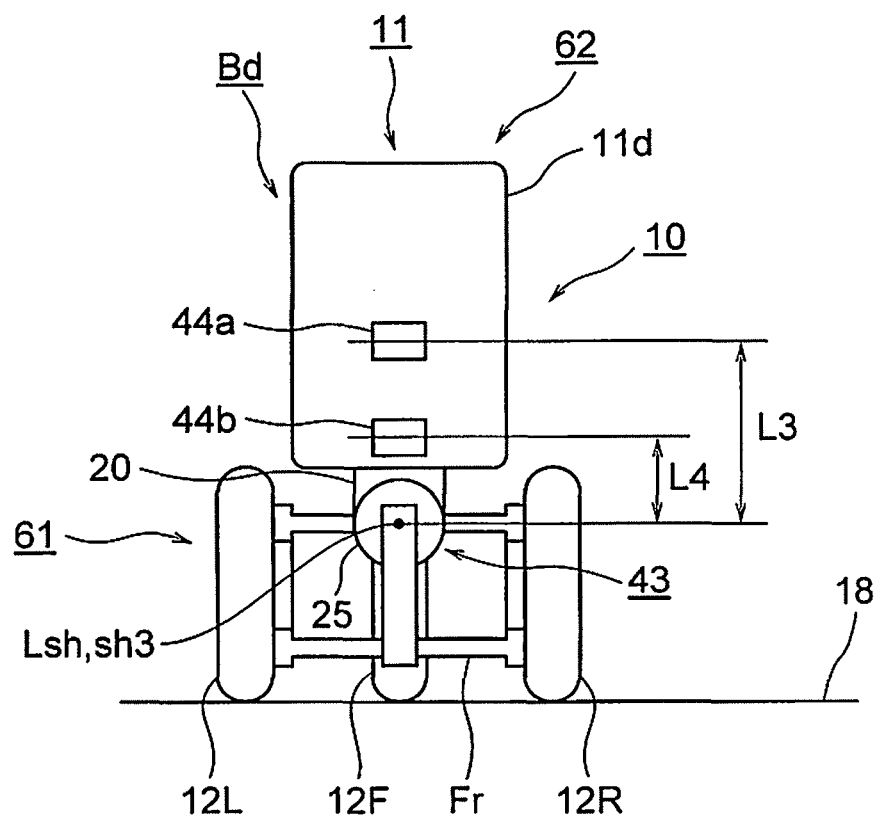
FIG. 19 Rear view of a tricycle according to a second embodiment of the present invention.
Figure 20:
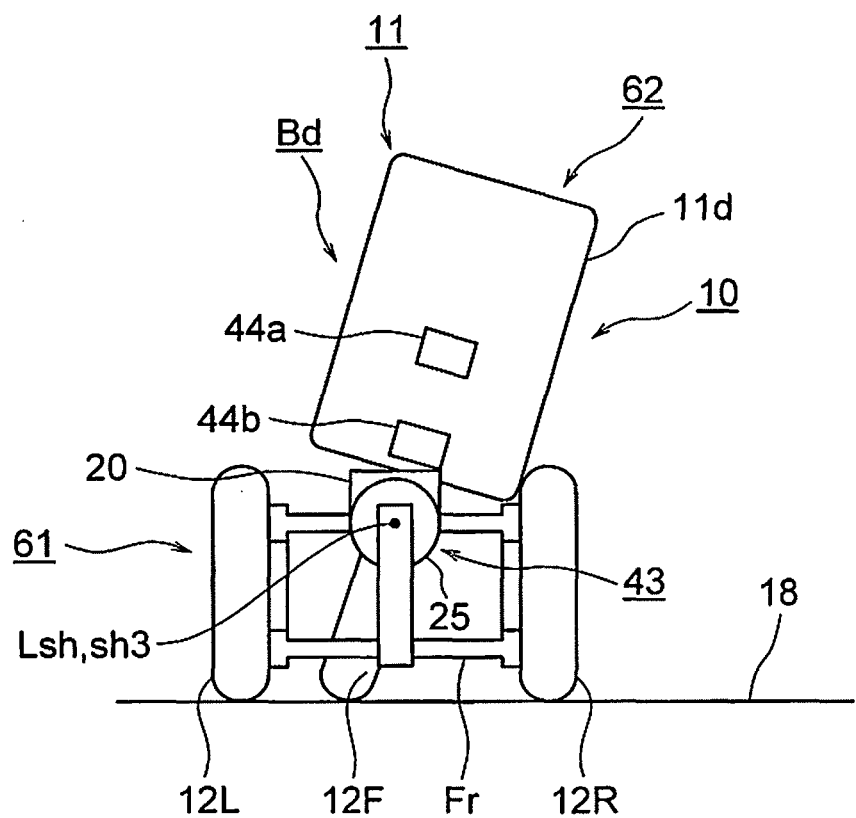
FIG. 20 View showing a state in which the tricycle according to the second embodiment of the present invention is partially inclined.

FIG. 19 is a rear view of a tricycle according to a second embodiment of the present invention. FIG. 20 is a view showing a state in which the tricycle according to the second embodiment of the present invention is partially inclined.

In these drawings, reference numeral Fr denotes a frame to which the support section 20 is attached, and which rotatably supports the wheels 12L and 12R. The support section 20 and the cockpit section 11 are connected together such that the cockpit section 11 can pivot about an unillustrated pivot shaft relative to the support section 20. Notably, the support section 20, the frame Fr, the vehicle inclining apparatus 43, the wheels 12L and 12R, etc. constitute the main body section 61; the wheel 12F, the front wheel fork 17 which serves as a steering shaft (FIG. 1), the manipulation apparatus 41, etc. constitute the steering section for steering the tricycle 10 (vehicle); and the steering section and the cockpit section 11 constitute the cockpit/steering section 62.

In this case, the vehicle inclining apparatus 43 inclines a predetermined inclination portion of the tricycle (the cockpit/steering section 62 in the present embodiment) leftward and rightward in relation to the road surface 18. Therefore, the vehicle inclining apparatus 43 includes a link motor 25 (serving as an actuator and a drive section for inclination) for inclining the cockpit/steering section 62. As shown in FIG. 20, by rotating the link motor 25, the cockpit/steering section 62 can be pivoted relative to the main body section 61, with an axis sh3 being used as a pivoting center and a roll center. Notably, the output shaft Lsh of the link motor 25 and the axis sh3 may be united together.

The first lateral acceleration sensor 44a and the second lateral acceleration sensor 44b, which serve as a plurality of (two in the present embodiment) lateral acceleration detection sections, are disposed on the back surface of the seat back portion 11d of the cockpit section 11 such that the two sensors are located at different heights.

Each of the first lateral acceleration sensor 44a and the second lateral acceleration sensor 44b are disposed on the upper side or lower side of the axis sh3 (on the upper side of the axis sh3 in the present embodiment). One of the first lateral acceleration sensor 44a and the second lateral acceleration sensor 44b is disposed at a position as close as possible to the axis sh3.

In the present embodiment, for calculation of the resultant lateral acceleration a, in place of the above-mentioned heights L1 and L2, distances L3 and L4 between the axis sh3 and the first lateral acceleration sensor 44a and the second lateral acceleration sensor 44b are used.

In the above-described embodiments, the first lateral acceleration sensor 44a and the second lateral acceleration sensor 44b are provided as lateral acceleration detection sections. However, at least one of the first lateral acceleration sensor 44a and the second lateral acceleration sensor 44b may be replaced with a roll rate sensor. In this case, the lateral acceleration can be detected by differentiating the roll rate detected by the roll rate sensor.

In the above-described embodiments, the tricycle 10 is described. However, the present invention can be applied to other types of vehicles such as two-wheel vehicles and four-wheel vehicles.

The present invention is not limited to the above-described embodiments. Numerous modifications and variations of the present invention are possible in light of the spirit of the present invention, and they are not excluded from the scope of the present invention.

The invention claimed is:

1. A vehicle characterized by comprising:
    a main body section having a wheel for travel;
    a cockpit section connected to the main body section;
    a steering section which includes a steering member operated by a driver, a wheel for steering, a steering shaft connecting the steering member and the wheel for steering and swingably supported by the cockpit section, and an acceleration operation member for accelerating the vehicle;
    a vehicle inclining apparatus which includes a vehicle inclining mechanism which inclines a predetermined inclination portion of the vehicle and an actuator for operating the vehicle inclining mechanism;
    a lateral acceleration detection section disposed at a predetermined location on the inclination portion and adapted to detect a lateral acceleration acting on the inclination portion;
    an inclination control processing section which generates a control value for inclination control for inclining the inclination portion, in accordance with the lateral acceleration detected by the lateral acceleration detection section;
    an inclination drive control processing section which drives the actuator on the basis of the control value for inclination control generated by the inclination control processing section;
    a travel control processing section which generates, on the basis of an amount of operation of the acceleration operation member by the driver, a control value for travel control for driving a drive section for travel for traveling the vehicle; and
    a travel drive control processing section which drives the drive section for travel on the basis of the control value for travel control generated by the travel control processing section,
    wherein the inclination control processing section includes:
    a centroid moving amount calculation processing section which calculates a moving amount of the centroid of the vehicle in a front-rear direction thereof,
    a maximum angular acceleration calculation processing section which calculates a maximum angular acceleration on the basis of the moving amount of the centroid of the vehicle in the front-rear direction thereof, and
    a first control value limiting processing section which limits a variation of the control value for inclination control on the basis of the maximum angular acceleration.

2. The vehicle according to claim 1, wherein the centroid moving amount calculation processing section calculates the moving amount of the centroid of the vehicle in the front-rear direction thereof on the basis of a longitudinal acceleration acting on the vehicle.

3. The vehicle according to claim 1, wherein the inclination control processing section includes a lateral stable distance calculation processing section which calculates, on the basis of the moving amount of the centroid of the vehicle in the front-rear direction thereof, a lateral stable distance which represents a permitted moving amount of the centroid in a width direction of the vehicle, and a maximum lateral acceleration calculation processing section which calculates a permitted maximum lateral acceleration on the basis of the lateral stable distance,
    wherein the maximum angular acceleration calculation processing section calculates the maximum angular acceleration on the basis of the maximum lateral acceleration.

4. The vehicle according to claim 1, wherein the travel control processing section includes a second control value limiting processing section which limits a variation of the control value for travel control.

* * * * *